(12) United States Patent
Shao et al.

(10) Patent No.: US 11,798,510 B2
(45) Date of Patent: Oct. 24, 2023

(54) DISPLAY APPARATUS AND DRIVING METHOD THEREOF

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Jiyang Shao, Beijing (CN); Yuxin Bi, Beijing (CN); Ziqiang Guo, Beijing (CN); Bingxin Liu, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 52 days.

(21) Appl. No.: 16/981,650

(22) PCT Filed: Sep. 11, 2019

(86) PCT No.: PCT/CN2019/105381
§ 371 (c)(1),
(2) Date: Sep. 16, 2020

(87) PCT Pub. No.: WO2021/046757
PCT Pub. Date: Mar. 18, 2021

(65) Prior Publication Data
US 2021/0193067 A1 Jun. 24, 2021

(51) Int. Cl.
*G09G 3/36* (2006.01)
*G09G 3/3266* (2016.01)
(Continued)

(52) U.S. Cl.
CPC ......... *G09G 3/3674* (2013.01); *G09G 3/3607* (2013.01); *G09G 3/3685* (2013.01);
(Continued)

(58) Field of Classification Search
CPC .. G09G 3/3685; G09G 3/3674; G09G 3/3607; G09G 3/20; G09G 3/32;
(Continued)

(56) References Cited

U.S. PATENT DOCUMENTS

| 4,160,973 A | 7/1979 | Berlin, Jr. |
| 2005/0035962 A1 | 2/2005 | Ishibashi et al. |

(Continued)

FOREIGN PATENT DOCUMENTS

| CN | 101404841 A | 4/2009 |
| CN | 101589328 A | 11/2009 |

(Continued)

OTHER PUBLICATIONS

English translation of CN109493774, Inventor Liu Banghong, Assignee Suzhou QisdaCO Ltd Corp., publication date Mar. 19, 2019. (Year: 2019).*

(Continued)

*Primary Examiner* — Nitin Patel
*Assistant Examiner* — Saifeldin E Elnafia
(74) *Attorney, Agent, or Firm* — Procopio, Cory, Hargreaves & Savitch LLP

(57) ABSTRACT

A display apparatus includes a display panel and a gate driving circuit. A display area of the display panel includes at least two sub-display areas, and each sub-display area of the at least two sub-display areas includes a plurality of sub-pixels. The gate driving circuit includes at least two gate driving sub-circuits in one-to-one correspondence with the at least two sub-display areas, and each gate driving sub-circuit of the at least two gate driving sub-circuits is elec- (Continued)

trically connected to a plurality of sub-pixels included in a corresponding sub-display area. Each gate driving sub-circuit is configured to receive a group of first control signals, generate a group of gate driving signals according to the group of first control signals, and output the group of gate driving signals to the plurality of sub-pixels included in the corresponding sub-display area.

17 Claims, 20 Drawing Sheets

(51) Int. Cl.
    *G09G 3/00*         (2006.01)
    *G09G 3/32*         (2016.01)
    *G09G 3/20*         (2006.01)

(52) U.S. Cl.
    CPC ............... *G09G 3/003* (2013.01); *G09G 3/20* (2013.01); *G09G 3/32* (2013.01); *G09G 3/3266* (2013.01); *G09G 3/36* (2013.01); *G09G 3/3677* (2013.01); *G09G 2300/0426* (2013.01); *G09G 2310/0221* (2013.01); *G09G 2310/0243* (2013.01); *G09G 2310/08* (2013.01); *G09G 2320/0252* (2013.01); *G09G 2320/0626* (2013.01); *G09G 2320/0686* (2013.01); *G09G 2350/00* (2013.01)

(58) Field of Classification Search
    CPC ... G09G 2320/0252; G09G 2310/0221; G09G 2310/0243; G09G 2350/00; G09G 3/3266; G09G 2320/0686; G09G 3/3677; G09G 2300/0426; G09G 2310/08; G09G 3/36; G09G 2320/0626; G09G 3/003; G09G 2310/0286; H04N 13/00
    See application file for complete search history.

(56) References Cited

U.S. PATENT DOCUMENTS

| | | | |
|---|---|---|---|
| 2007/0091059 A1* | 4/2007 | Kang | G09G 3/342 345/102 |
| 2011/0234772 A1 | 9/2011 | Ito et al. | |
| 2014/0085279 A1* | 3/2014 | Shiomi | G09G 3/3611 345/204 |
| 2015/0109357 A1* | 4/2015 | Nakai | G09G 3/36 345/691 |
| 2017/0011702 A1 | 1/2017 | Yamagishi | |
| 2018/0174520 A1* | 6/2018 | Park | G09G 3/3258 |
| 2018/0366068 A1 | 12/2018 | Liu et al. | |
| 2019/0237021 A1* | 8/2019 | Peng | G09G 5/391 |
| 2019/0279574 A1 | 9/2019 | Kim et al. | |
| 2020/0251066 A1 | 8/2020 | Hu et al. | |

FOREIGN PATENT DOCUMENTS

| | | |
|---|---|---|
| CN | 101594547 A | 12/2009 |
| CN | 102239438 A | 11/2011 |
| CN | 102291589 A | 12/2011 |
| CN | 102447935 A | 5/2012 |
| CN | 103871352 A | 6/2014 |
| CN | 104732592 A | 6/2015 |
| CN | 205910451 U | 1/2017 |
| CN | 106782268 A | 5/2017 |
| CN | 106875890 A | 6/2017 |
| CN | 109493774 A | 3/2019 |
| CN | 109686333 A | 4/2019 |
| CN | 208706216 U | 4/2019 |
| CN | 110023881 A | 7/2019 |
| CN | 112562558 A | 3/2021 |

OTHER PUBLICATIONS

First Chinese Office Action for related Application No. 201980001695.6, dated Apr. 19, 2022, 20 pages.

* cited by examiner

S11

Each gate driving sub-circuit corresponding to each sub-display area in viewing area(s) of the same level outputs the group of gate driving signals representing the same frame rate to the plurality of sub-pixels included in the corresponding sub-display area, so as to make a frame rate of an image displayed on each sub-display area in the viewing area(s) of the level equal; and gate driving sub-circuits corresponding to sub-display areas in viewing areas of different levels output groups of gate driving signals representing different frame rates to a plurality of sub-pixels included in corresponding sub-display areas, so as to make frame rates of images displayed on the viewing areas of different levels different

FIG. 21

DISPLAY APPARATUS AND DRIVING METHOD THEREOF

CROSS-REFERENCE TO RELATED APPLICATION

This application is a national phase entry under 35 USC 371 of International Patent Application No. PCT/CN2019/105381 filed on Sep. 11, 2019, which is incorporated herein by reference in its entirety.

TECHNICAL FIELD

The present disclosure relates to the field of display technologies, and in particular, to a display apparatus and a driving method thereof.

BACKGROUND

Display apparatuses are widely used in daily lives of people. Types of the display apparatus include a liquid crystal display (LCD) apparatus, an organic light-emitting diode (OLED) display apparatus, a mini light-emitting diode (Mini LED) display apparatus, a micro light-emitting diode (Micro LED) display apparatus and the like. A frame rate of the display apparatuses is generally 60 Hz to 240 Hz. With the development of display technologies, in order to obtain a better display effect, especially for a rotating stereoscopic display, display apparatuses with a high frame rate have become one of research hotspots in the field of display.

SUMMARY

In an aspect, a display apparatus is provided, and the display apparatus includes a display panel and a gate driving circuit. A display area of the display panel includes at least two sub-display areas, and each sub-display area of the at least two sub-display areas includes a plurality of sub-pixels. The gate driving circuit includes at least two gate driving sub-circuits in one-to-one correspondence with the at least two sub-display areas, and each gate driving sub-circuit of the at least two gate driving sub-circuits is electrically connected to a plurality of sub-pixels included in a corresponding sub-display area; and each gate driving sub-circuit is configured to: receive a group of first control signals, generate a group of gate driving signals according to the group of first control signals, and output the group of gate driving signals to the plurality of sub-pixels included in the corresponding sub-display area.

In some embodiments, the plurality of sub-pixels included in each sub-display area are arranged in a matrix with a same number of rows and a same number of columns.

In some embodiments, the display panel further includes at least two groups of gate lines in one-to-one correspondence with the at least two sub-display areas. Each group of the at least two groups of gate lines is electrically connected to a plurality of sub-pixels included in a corresponding sub-display area. Each gate driving sub-circuit is electrically connected to a group of gate lines corresponding to the corresponding sub-display area.

In some embodiments, the display apparatus further includes a source driving circuit. The source driving circuit is configured to: receive at least two groups of second control signals and at least two groups of first data signals, convert the at least two groups of first data signals into at least two groups of second data signals in one-to-one correspondence with the at least two sub-display areas according to the at least two groups of second control signals, and output each group of second data signals to a plurality of sub-pixels included in a corresponding sub-display area.

In some embodiments, the display panel further includes at least two groups of data lines in one-to-one correspondence with the at least two sub-display areas, and each group of the at least two groups of data lines is electrically connected to a plurality of sub-pixels included in a corresponding sub-display area. The source driving circuit is electrically connected to the at least two groups of data lines.

In some embodiments, the display apparatus further includes a driving chip. The driving chip includes the gate driving circuit and at least two driving ports. The at least two driving ports are electrically connected to the at least two gate driving sub-circuits in a one-to-one correspondence manner. Each gate driving sub-circuit is electrically connected to the group of gate lines corresponding to the corresponding sub-display area through a corresponding driving port.

In some embodiments, the driving chip further includes the source driving circuit and at least two data ports. The source driving circuit is electrically connected to the at least two groups of data lines through the at least two data ports.

In some embodiments, the sub-pixels included in each sub-display area are arranged in a plurality of rows and a plurality of columns. For each sub-display area, a number of gate lines included in a group of gate lines corresponding to the sub-display area is equal to a number of rows of the sub-pixels included in the sub-display area, and the gate lines in the group of gate lines corresponding to the sub-display area are electrically connected to the rows of the sub-pixels included in the sub-display area in a one-to-one correspondence manner; and a number of data lines included in a group of data lines corresponding to the sub-display area is equal to a number of columns of the sub-pixels included in the sub-display area, and the data lines in the group of data lines corresponding to the sub-display area are electrically connected to the columns of the sub-pixels included in the sub-display area in a one-to-one correspondence manner.

In some embodiments, for each sub-display area, a group of gate lines corresponding to the sub-display area includes a gate line, and the gate line corresponding to the sub-display area is electrically connected to the plurality of sub-pixels included in the sub-display area; and a number of data lines included in a group of data lines corresponding to the sub-display area is equal to a number of the sub-pixels included in the sub-display area, and the data lines in the group of data lines corresponding to the sub-display area are electrically connected to the plurality of sub-pixels included in the sub-display area in a one-to-one correspondence manner.

In some embodiments, the display apparatus further includes a timing controller electrically connected to the gate driving circuit and the source driving circuit. The timing controller is configured to: receive source signals, generate at least two groups of first control signals, the at least two groups of second control signals, and the at least two groups of first data signals according to the source signals, output the at least two groups of first control signals to the gate driving circuit, and output the at least two groups of second control signals and the at least two groups of first data signals to the source driving circuit.

In some embodiments, the display apparatus further includes a rotation axis. The display panel is configured to be rotatable around the rotation axis. The display panel has at least two brightness adjustment areas, and a length direction of each brightness adjustment area of the at least two brightness adjustment areas is parallel to the rotation axis, and the at least two brightness adjustment areas are arranged in parallel along a direction perpendicular to the rotation axis. Each brightness adjustment area includes at least one sub-display area.

In some embodiments, the source driving circuit is further configured to adjust each group of second data signals to be output to each sub-display area in a corresponding brightness adjustment area separately according to a preset brightness parameter of each brightness adjustment area, so as to make an average display brightness of each of the at least two brightness adjustment areas be same or approximately same. The brightness parameter of each brightness adjustment area increases sequentially along a direction perpendicular to the rotation axis and progressively away from the rotation axis.

In another aspect, some embodiments of the present disclosure provide a driving method of a display apparatus, which is applied to the display apparatus described in any of the above embodiments. The driving method includes: receiving, by each gate driving sub-circuit included in the gate driving circuit, the group of first control signals, generating, by each gate driving sub-circuit, the group of gate driving signals according to the group of first control signals, and outputting, by each gate driving sub-circuit, the group of gate driving signals to the plurality of sub-pixels included in the corresponding sub-display area in the display panel.

In some embodiments, the display apparatus further includes a source driving circuit. The driving method further includes: receiving, by the source driving circuit, at least two groups of second control signals and at least two groups of first data signals, converting, by the source driving circuit, the at least two groups of first data signals into at least two groups of second data signals in one-to-one correspondence with the at least two sub-display areas in the display panel according to the at least two groups of second control signals, and outputting, by the source driving circuit, each group of second data signals to a plurality of sub-pixels included in a corresponding sub-display area.

In some embodiments, the display apparatus further includes a rotation axis, and the display panel is configured to be rotatable around the rotation axis. The display panel has at least two brightness adjustment areas, and a length direction of each brightness adjustment area of the at least two brightness adjustment areas is parallel to the rotation axis, and the at least two brightness adjustment areas are arranged in parallel along a direction perpendicular to the rotation axis. Each brightness adjustment area includes at least one sub-display area. Before each group of second data signals is output to the plurality of sub-pixels included in the corresponding sub-display area, the driving method further includes: adjusting separately, by the source driving circuit, the at least two groups of second data signals obtained by conversion according to a preset brightness parameter of each brightness adjustment area, so as to make an average display brightness of each brightness adjustment area of the at least two brightness adjustment areas be same or approximately same. The brightness parameter of each brightness adjustment area increases sequentially along a direction perpendicular to the rotation axis and progressively away from the rotation axis.

In some embodiments, the brightness parameter includes a duty ratio coefficient of each second data signal in each group of second data signals obtained by conversion and corresponding to a respective sub-display area in a target brightness adjustment area. Along the direction perpendicular to the rotation axis and progressively away from the rotation axis, a ratio of duty ratio coefficients of the brightness adjustment areas is inversely related to a ratio of display brightness of the brightness adjustment areas in a case where the at least two groups of second data signals obtained by conversion are not adjusted separately.

In some embodiments, adjusting the at least two groups of second data signals obtained by conversion separately according to a preset brightness parameter of each brightness adjustment area, includes: multiplying a duty ratio of each second data signal in each group of second data signals obtained by conversion and corresponding to a respective sub-display area in each brightness adjustment area by a duty ratio coefficient of the brightness adjustment area, so as to obtain each second data signal in each adjusted group of second data signals corresponding to the respective sub-display area in the brightness adjustment area.

In some embodiments, the brightness parameter includes a gray coefficient of each second data signal in each group of second data signals obtained by conversion and corresponding to a respective sub-display area in a target brightness adjustment area. Along the direction perpendicular to the rotation axis and progressively away from the rotation axis, a ratio of gray coefficients of the brightness adjustment areas is inversely related to a ratio of display brightness of the brightness adjustment areas in a case where the at least two groups of second data signals obtained by conversion are not adjusted separately.

In some embodiments, adjusting the at least two groups of second data signals obtained by conversion separately according to a preset brightness parameter of each brightness adjustment area, includes: multiplying a gray value represented by each second data signal in each group of second data signals obtained by conversion and corresponding to a respective sub-display area in each brightness adjustment area by a gray coefficient of the brightness adjustment area, so as to obtain each second data signal in each adjusted group of second data signals corresponding to the respective sub-display area in the brightness adjustment area.

In some embodiments, the display panel has at least two different levels of viewing areas, and each level of the at least two different levels of viewing areas includes at least one sub-display area. Outputting, by each gate driving sub-circuit, the group of gate driving signals to the plurality of sub-pixels included in the corresponding sub-display area in the display panel, includes: outputting, by each gate driving sub-circuit corresponding to a respective sub-display area in each viewing area of a same level, the group of gate driving signals representing a same frame rate to the plurality of sub-pixels included in the corresponding sub-display area, so as to make a frame rate of an image displayed on each sub-display area in each viewing area of the level equal; and outputting, by gate driving sub-circuits corresponding to sub-display areas in viewing areas of different levels, groups of gate driving signals representing different frame rates to a plurality of sub-pixels included in corresponding sub-display areas, so as to make frame rates of images displayed on the viewing areas of different level different. A frame rate of an image displayed on each viewing area progressively decreases as a level of the viewing area progressively increases.

In yet another aspect, some embodiments of the present disclosure provide a computer product including at least one processor, and the at least one processor is configured to execute computer instructions to perform the driving method of the display apparatus according to any of the above embodiments.

In yet another aspect, some embodiments of the present disclosure provide a non-transitory computer-readable storage medium storing an executable instruction that, when executed by the display apparatus of any of the above embodiments, causes the display apparatus to perform the driving method of the display apparatus of any of the above embodiments.

BRIEF DESCRIPTION OF THE DRAWINGS

In order to describe technical solutions in some embodiments of the present disclosure more clearly, the accompanying drawings to be used in some embodiments of the present disclosure will be introduced briefly. Obviously, the accompanying drawings to be described below are merely some embodiments of the present disclosure, and a person of ordinary skill in the art can obtain other drawings according to the accompanying drawings.

FIG. 21 is a flow diagram of yet another driving method of a display apparatus, in accordance with some embodiments.

DETAILED DESCRIPTION

The technical solutions in embodiments of the present disclosure will be described clearly and completely in combination with the accompanying drawings in some embodiments of the present disclosure. Obviously, the described embodiments are merely some but not all of the embodiments of the present disclosure. All other embodiments obtained by a person of ordinary skill in the art based on some embodiments of the present disclosure shall be included in the protection scope of the present disclosure.

In some embodiments of the present disclosure, "a plurality of" means two or more unless otherwise specified. "First" and "second" are used to distinguish between same or similar items whose functions and effects are substantially the same. Moreover, a person skilled in the art will understand that the "first" and "second" are not intended to limit a quantity and an order of execution of the items, and do not limit the items to be different from each other.

A continuous video image is formed on a display panel in a display apparatus in a plurality of frame periods (a frame period being the time for displaying one frame of an image) by displaying images frame by frame. In the related art, in each frame period, a line scanning circuit is generally used to perform a progressive scanning to all the sub-pixels in a whole display panel, so as to display one frame of an image. Based on this, all the sub-pixels in the whole display panel display the image at a same frame rate, generally 60 Hz to 240 Hz.

For common flat panel displays such as a TV display and a computer screen display, if a frame rate of a display image on the display apparatus reaches about 60 Hz, human eyes may view a very smooth display image. In a case where the frame rate is higher than 60 Hz, it is not easy for the human eyes to notice a significant smoothness improvement of the image. For an augmented reality (AR) display and a virtual reality (VR) display, a frame rate of the display image is required to reach 90 Hz to realize a smooth display. In a case where the frame rate reaches a few hundred hertz, the AR display and VR display will achieve an ideal effect. For a stereoscopic display such as a rotating display, a display of a stereoscopic image needs to quickly display several pictures in sequence to form a stereoscopic image. Therefore, the image displayed on the display apparatus need to have a particularly high frame rate (such as several thousand hertz or tens of thousands of hertz), so as to display the desired image smoothly.

Figure 1:
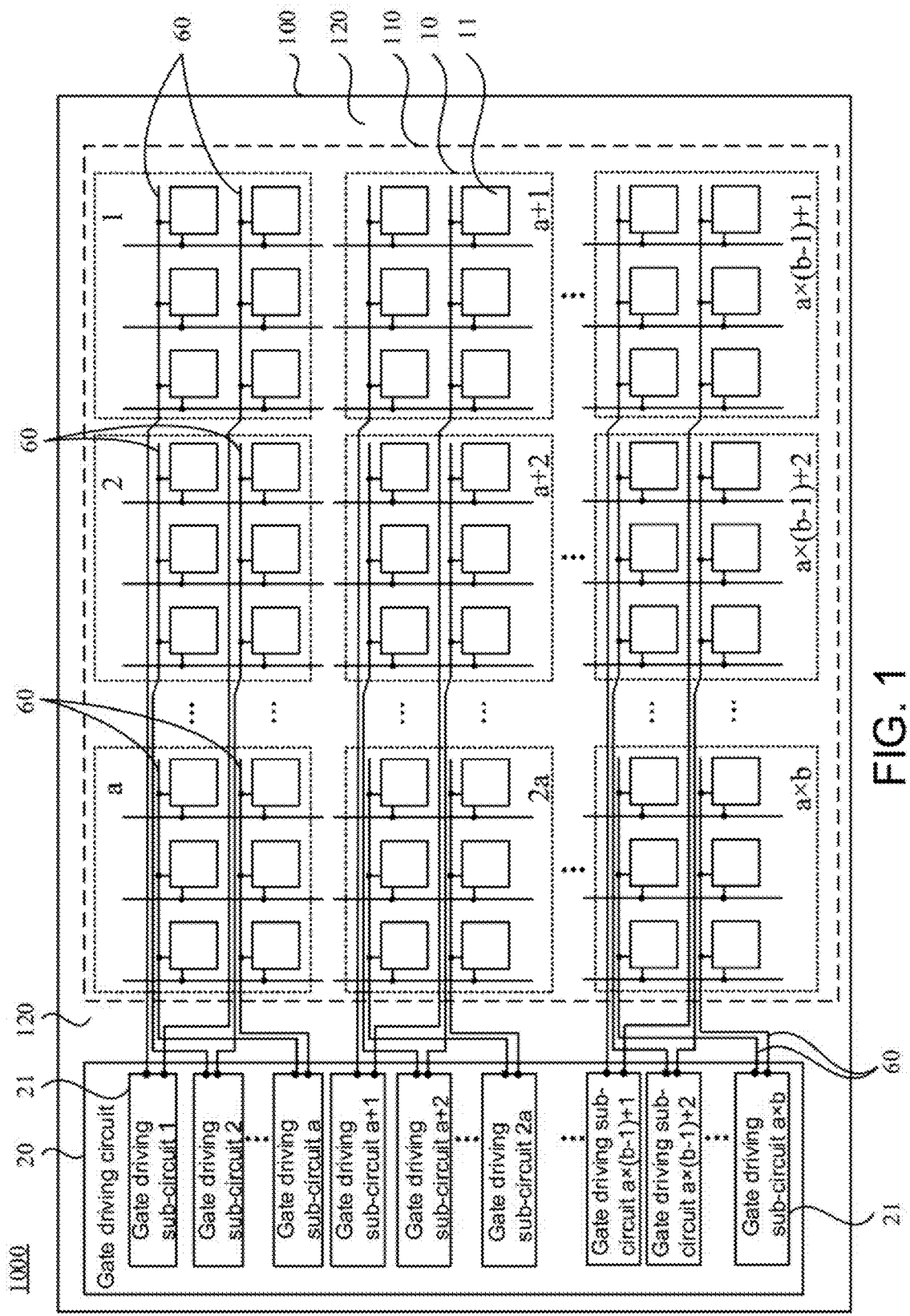
FIG. 1 is a structural schematic diagram of a display apparatus, in accordance with some embodiments.

Referring to FIG. 1, some embodiments of the present disclosure provide a display apparatus 1000 including a display panel 100 and a gate driving circuit 20.

The display panel 100 has a display area 110 and a non-display area 120. In the embodiments of the present disclosure, the display area 110 is an area for display in the display panel 100, and the non-display area 120 is an area in a periphery of the display area 110 and not used for display. The display area 110 of the display panel 100 includes at least two sub-display areas 10 (for example, the display area 110 of the display panel 100 includes a×b sub-display areas 10 in FIG. 1), and each sub-display area 10 of the at least two sub-display areas 10 includes a plurality of sub-pixels 11.

The gate driving circuit 20 includes at least two gate driving sub-circuits 21 (for example, a×b gate driving sub-circuits 21 shown in FIG. 1) in one-to-one correspondence with the at least two sub-display areas 10. Each gate driving sub-circuit 21 of the at least two gate driving sub-circuits 21 is electrically connected to a plurality of sub-pixels 11 included in a corresponding sub-display area 10. Each gate driving sub-circuit 21 is configured to receive a group of first control signals, generate a group of gate driving signals, and output the group of gate driving signals to the plurality of sub-pixels 11 included in the corresponding sub-display area 10.

Figure 3:
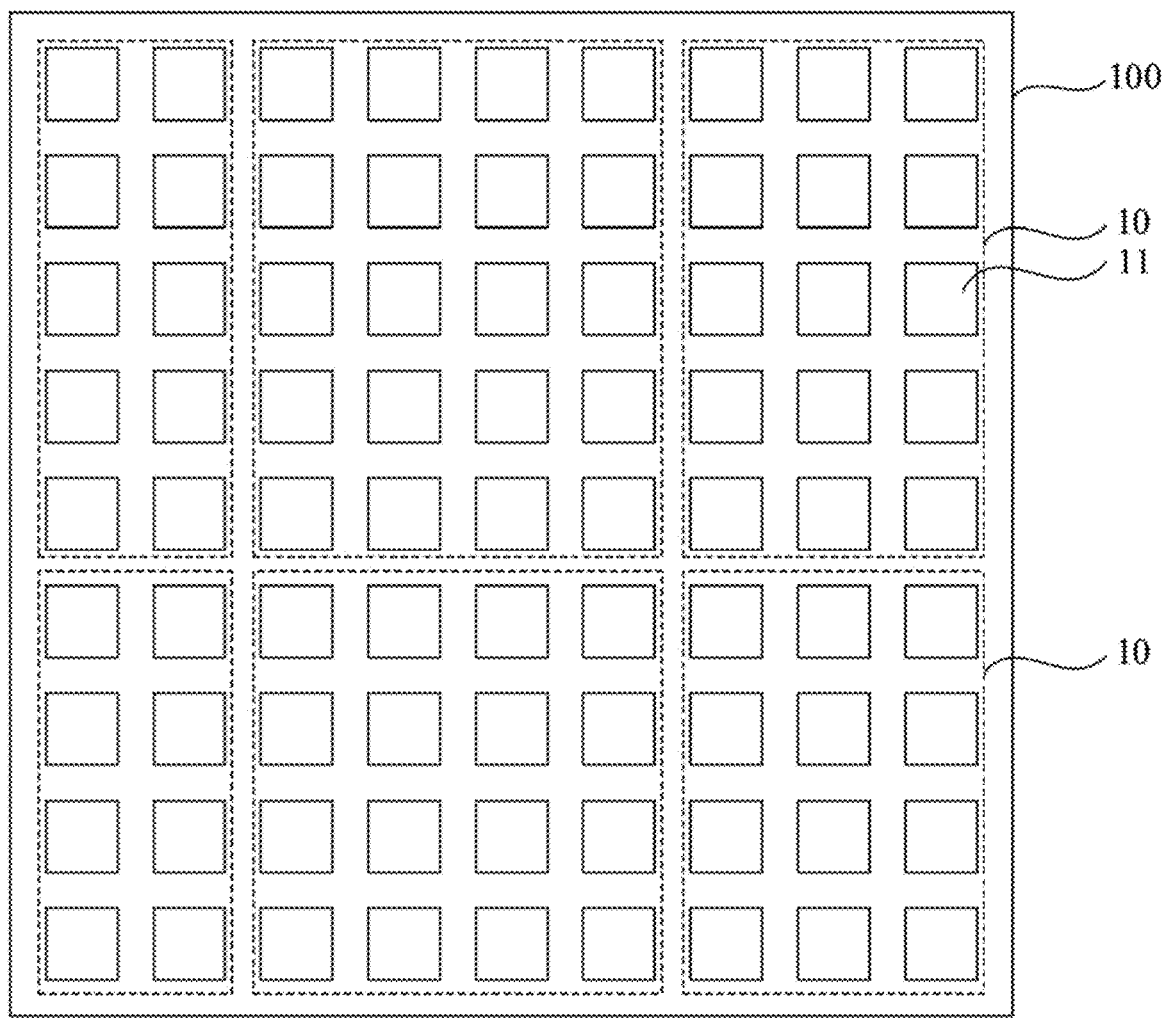
FIG. 3 is a structural schematic diagram of sub-display areas in another display apparatus, in accordance with some embodiments.
Figure 4:
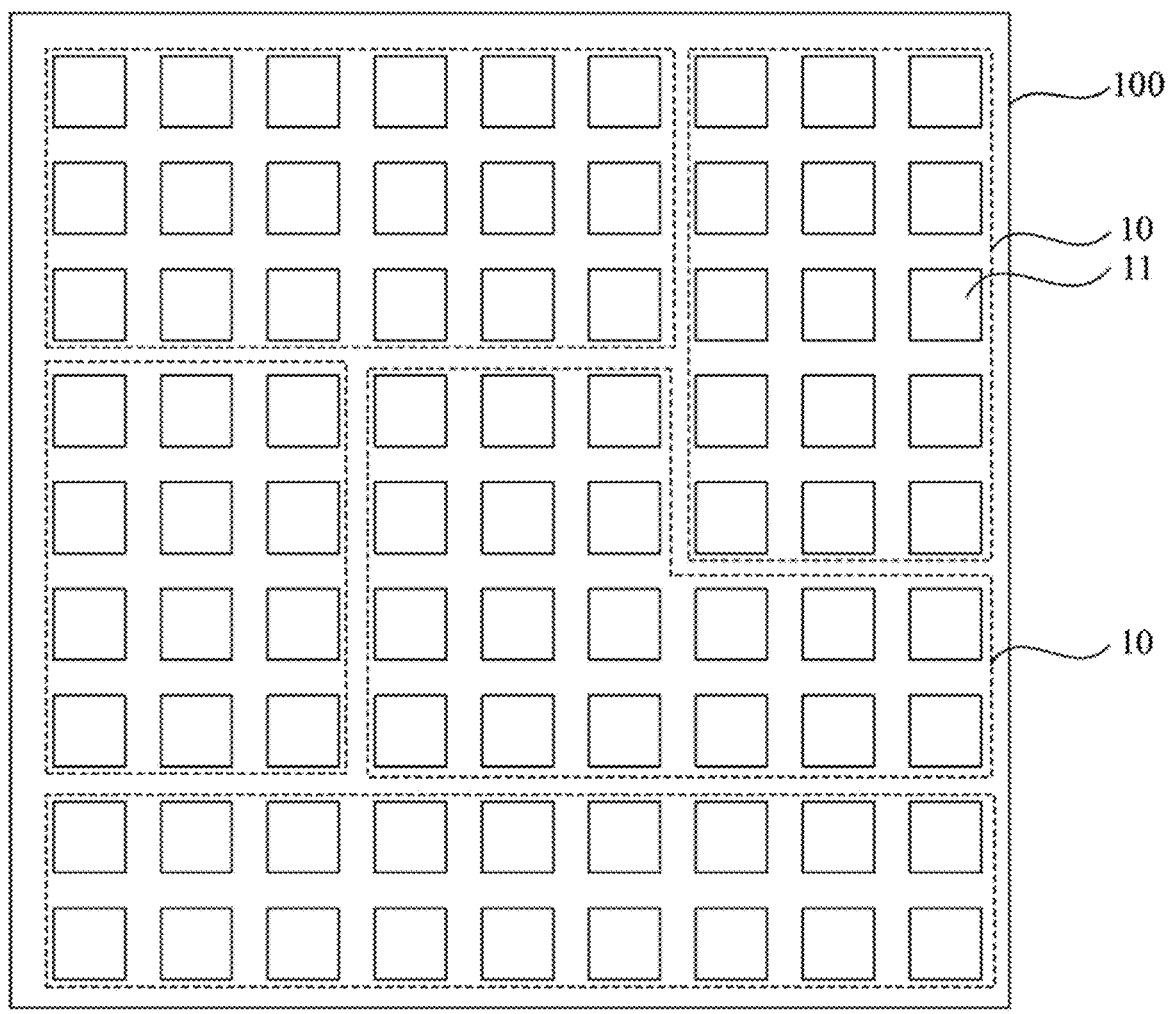
FIG. 4 is a structural schematic diagram of sub-display areas in yet another display apparatus, in accordance with some embodiments.

Based on this, it is possible that a number of sub-pixels 11 in different sub-display areas 10 in the display panel 100 is the same or different. For example, referring to FIG. 2, in the at least two sub-display areas 10, a number of the plurality of sub-pixels 11 included in each sub-display area 10 is the same; or, referring to FIGS. 3 and 4, in the at least two sub-display areas 10, the number of the plurality of sub-pixels 11 included in each sub-display area 10 is different.

Figure 2:
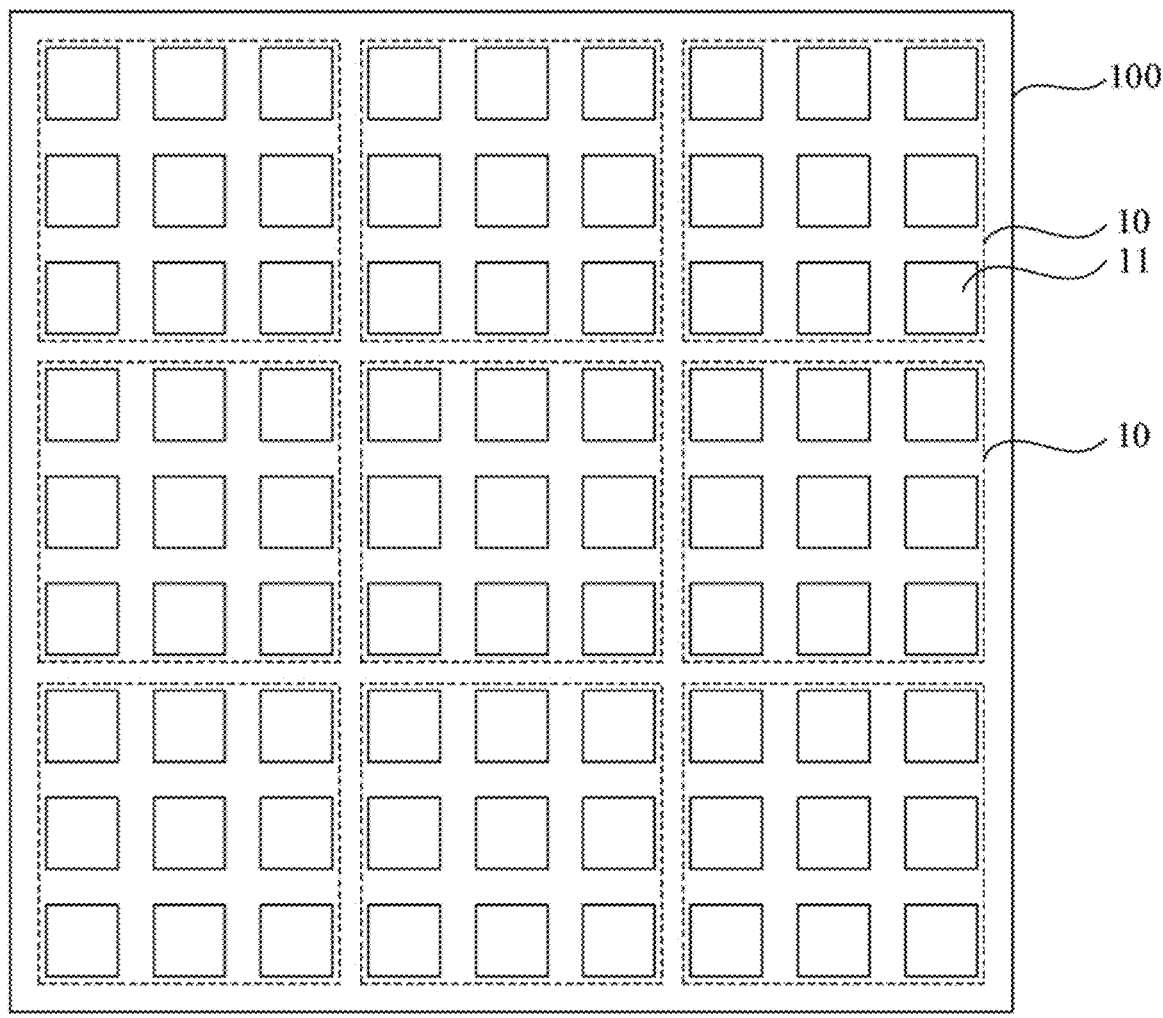
FIG. 2 is a structural schematic diagram of sub-display areas in a display apparatus, in accordance with some embodiments.

Optionally, in a case where the number of the plurality of sub-pixels 11 included in each sub-display area 10 is the same, referring to FIG. 2, the plurality of sub-pixels 11 included in each sub-display area 10 are arranged in a matrix, and the plurality of sub-pixels 11 included in each sub-display area 10 are arranged in a same number of rows and in a same number of columns.

There may be various arrangement manners of the sub-display areas 10 in the display panel 100. For example, referring to FIGS. 2 and 3, the plurality of sub-display areas 10 in the display panel 100 are arranged in a matrix; or, referring to FIG. 4, the plurality of sub-display areas 10 are divided into any shapes according to display needs.

Some embodiments of the present disclosure do not limit an arrangement manner of the sub-display areas 10, the number of the sub-pixels 11 in each sub-display area 10, and a shape of each sub-display area 10. In practice, the sub-display areas 10 may be divided according to actual display needs.

In some embodiments of the present disclosure, the display area 110 of the display panel 100 is divide into the at least two sub-display areas 10. For each sub-display area 10, the sub-display area 10 is driven by one gate driving sub-circuit 21, so that an independent gate driving signal is input to the sub-display area 10 to realize a partition driving of the display panel 100, and the sub-pixels 11 in different sub-display areas 10 may be synchronously scanned in one frame period. That is to say, each gate driving sub-circuit 21 only needs to scan the plurality of sub-pixels 11 in the corresponding sub-display area 10 without scanning all the sub-pixels 11 in the whole display panel 100. Therefore, it takes a short time for each gate drive sub-circuit 21 to complete the scanning of the plurality of sub-pixels 11 in the corresponding sub-display area 10. In a case where a plurality of gate driving sub-circuits 21 simultaneously scan a plurality of sub-pixels 11 in the corresponding sub-display areas 10, the time for completing one scanning for all the sub-pixels 11 in the whole display panel 100 may be greatly reduced. That is, the frame period is greatly shortened, so that the frame rate of the display image is significantly increased, and the frame rate of the display image may reach an ultra-high frame rate. As a result, the display image has a higher clarity and smoothness, and phenomena of trailing, image retention or the like will not occur.

Herein, the ultra-high frame rate refers to a frame rate greater than or equal to 90 Hz, such as 90 Hz, 120 Hz, 240 Hz, 300 Hz, 500 Hz, 1000 Hz, 3000 Hz, 5000 Hz, 8000 Hz, 10000 Hz, or 20000 Hz.

In addition, some embodiments of the present disclosure may realize an independent driving of each sub-display area 10. That is, parameters such as timing of one group of gate driving signals corresponding to each sub-display area 10 are adjusted, so that different sub-display areas 10 may display images at different frame rates, and an asynchronous scanning refresh between different sub-display areas 10 may also be realized. For example, a display image may be divided into a main viewing area image and a secondary viewing area image according to viewing needs and attentions to the display image of users. Sub-display areas 10 displaying the main viewing area image is considered to be in a main viewing area, and sub-display areas 10 displaying the secondary viewing area image is considered to be in a secondary viewing area. Each sub-display area 10 is driven separately, which may cause the sub-display areas 10 in the main viewing area to display an image at a high frame rate, and cause the sub-display areas 10 in the secondary viewing area to display an image at a low frame rate. Compared with a manner in which all the sub-display areas 10 in the whole display panel 100 display the image at a high frame rate, a data amount of source signals may be effectively reduced, thereby effectively reducing an overall bandwidth of data transmission without affecting viewing experience of the users.

Referring to FIG. 1, in some embodiments, the display panel 100 further includes at least two groups of gate lines 60 in one-to-one correspondence with the at least two sub-display areas 10. Each group of gate lines 60 of the at least two groups of gate lines 60 is electrically connected to a plurality of sub-pixels 11 included in a corresponding sub-display area 10, and each gate driving sub-circuit 21 is electrically connected to one group of gate lines 60 corresponding to the corresponding sub-display area 10. A sub-display area 10 numbered a in FIG. 1 is taken as an example. One group of gate lines 60 corresponding to the sub-display area a is shown in FIG. 1, and a gate driving sub-circuit corresponding to the sub-display area a is a gate driving sub-circuit a. The gate driving sub-circuit a is connected to sub-pixels 11 in the sub-display area a through the group of gate lines 60.

There may be various arrangement manners of the gate driving circuit 20 in the display apparatus 1000. For example, the gate driving circuit 20 may be provided separately, for example, the gate driving circuit 20 is a gate driving chip (Gate IC) or a gate driver on array (GOA) circuit. For example, the gate driving circuit 20 may also be integrated in a driving chip of the display apparatus. As long as it is possible to input the independent gate driving signal to each sub-display area 10 through each gate driving sub-circuit 21 in the gate driving circuit 20 to realize a partition control of each sub-display area 10. Some embodiments of the present disclosure do not limit thereto.

Figure 5:
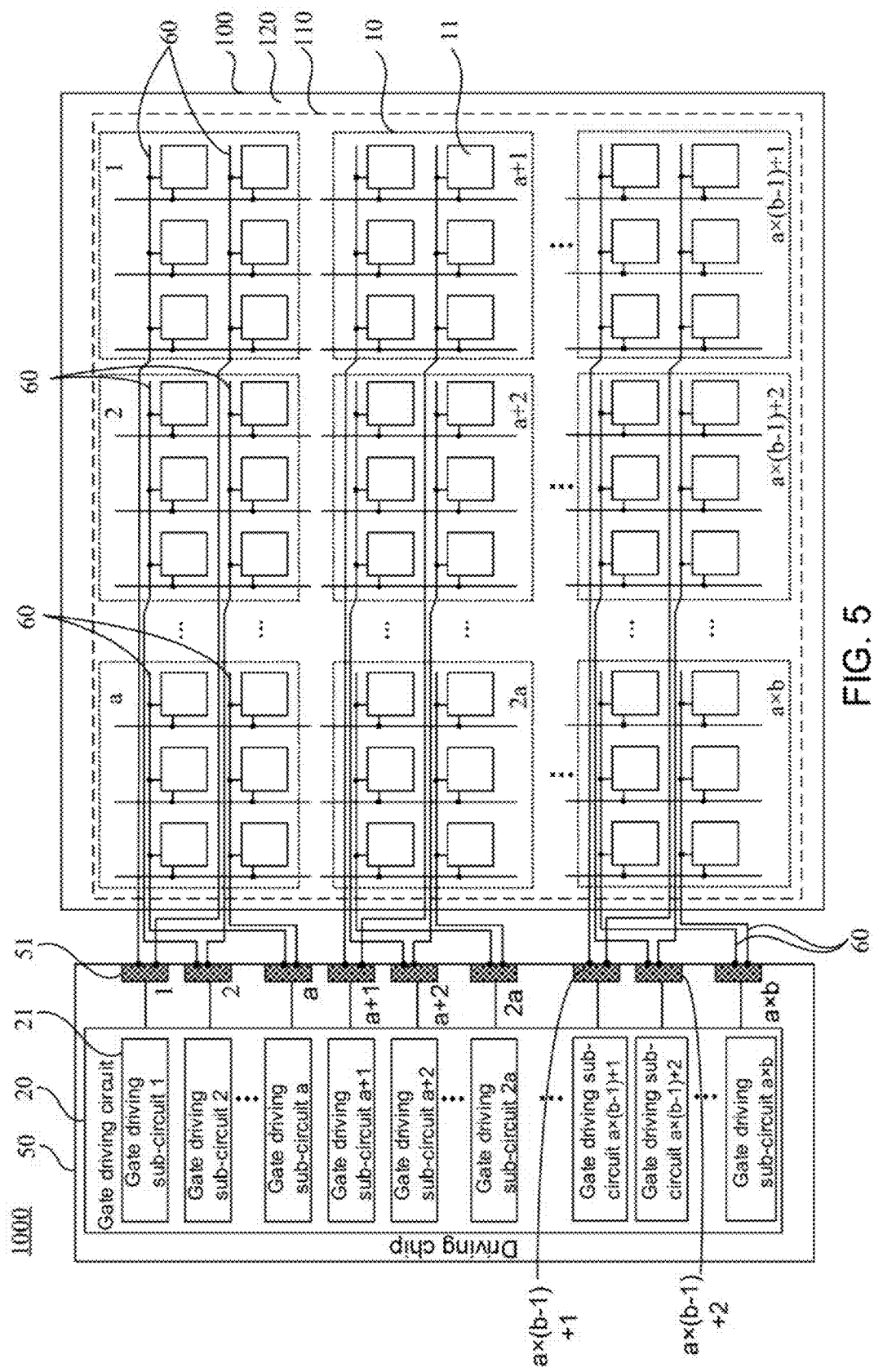
FIG. 5 is a structural schematic diagram of another display apparatus, in accordance with some embodiments.

Referring to FIG. 5, in some embodiments, the display apparatus 1000 includes a driving chip 50. The driving chip 50 includes the gate driving circuit 20. It will be understood that the gate driving circuit 20 is integrated in the driving chip 50 of the display apparatus. The driving chip 50 further includes at least two driving ports 51, and the at least two driving ports 51 are electrically connected to the at least two gate driving sub-circuits 21 in a one-to-one correspondence manner. Each gate driving sub-circuit 21 is electrically connected to the group of gate lines 60 corresponding to the corresponding sub-display area 10 through a corresponding driving port 51.

For example, referring to the display apparatus 1000 shown in FIG. 5, the display apparatus 1000 is provided with the driving chip 50 therein, and the gate driving circuit 20 is integrated in the driving chip 50. The driving chip 50 further includes a×b driving ports 51 numbered from 1 to a×b. The display area 110 of the display panel 100 includes a×b sub-display areas 10 numbered from 1 to a×b, and the a×b driving ports 51 are in one-to-one correspondence with the a×b sub-display areas 10. The sub-display area a is taken as an example, the gate driving sub-circuit a, a driving port a and one group of gate lines 60 that are corresponding to the sub-display area a are shown in FIG. 5. The group of gate lines 60 is connected to the driving port a. One group of gate driving signals output by the gate driving sub-circuit a is transmitted to sub-pixels 11 in the sub-display area a by the group of gate lines 60 through the driving port a.

In some other embodiments, the gate driving circuit 20 is disposed in the non-display area 120 of the display panel 100. Each gate driving sub-circuit 21 is directly electrically connected to the group of gate lines 60 corresponding to the corresponding sub-display area 10.

For example, referring to FIG. 1, the display panel 100 includes an array substrate. The gate driving circuit 20 is disposed on the array substrate in the display panel 100 and disposed in an area of the array substrate corresponding to the non-display area 120. Herein, each gate driving sub-circuit 21 in the gate driving circuit 20 is, for example, a GOA sub-circuit. That is, one or more shift register circuits are integrated on the array substrate to form one gate driving sub-circuit 21, and the plurality of gate driving sub-circuits 21 form the gate driving circuit 20. The GOA sub-circuit serving as the gate drive sub-circuit 21 has the advantages of low cost, and is conductive to realize a narrow bezel of the display apparatus 1000. In this case, signals received by each gate driving sub-circuit 21 are, for example, a group of first control signals including clock signals (CLK). A gate driving sub-circuit numbered as a is taken as an example. The gate driving sub-circuit a outputs one group of gate driving signals under the control of one group of first control signals, and transmits the group of gate driving signals to the sub-pixel 11 in the corresponding sub-display area through one group of gate lines 60 connected to the gate driving sub-circuit a.

It is worth mentioning that the gate driving circuit 20 may be disposed on at least one side of the periphery of the display area 110, which is not limited in some embodiments of the present disclosure. For example, as shown in FIG. 1, the gate driving circuit 20 is disposed in the non-display area 120, and is located on one side of the periphery of the display area 110, so as to realize an unilateral driving for the sub-pixels 11 in the display area 110. For another example, the gate driving circuit 20 is disposed in the non-display area 120, and is located on two opposite sides of the periphery of the display area 110, so as to realize a bilateral driving for the sub-pixels 11 in the display area 110. For yet another example, the gate driving circuit 20 is disposed in the non-display area 120, and is located on the periphery of the display area 110, so as to realize a multilateral driving for the sub-pixels 11 in the display area 110.

Figure 6:
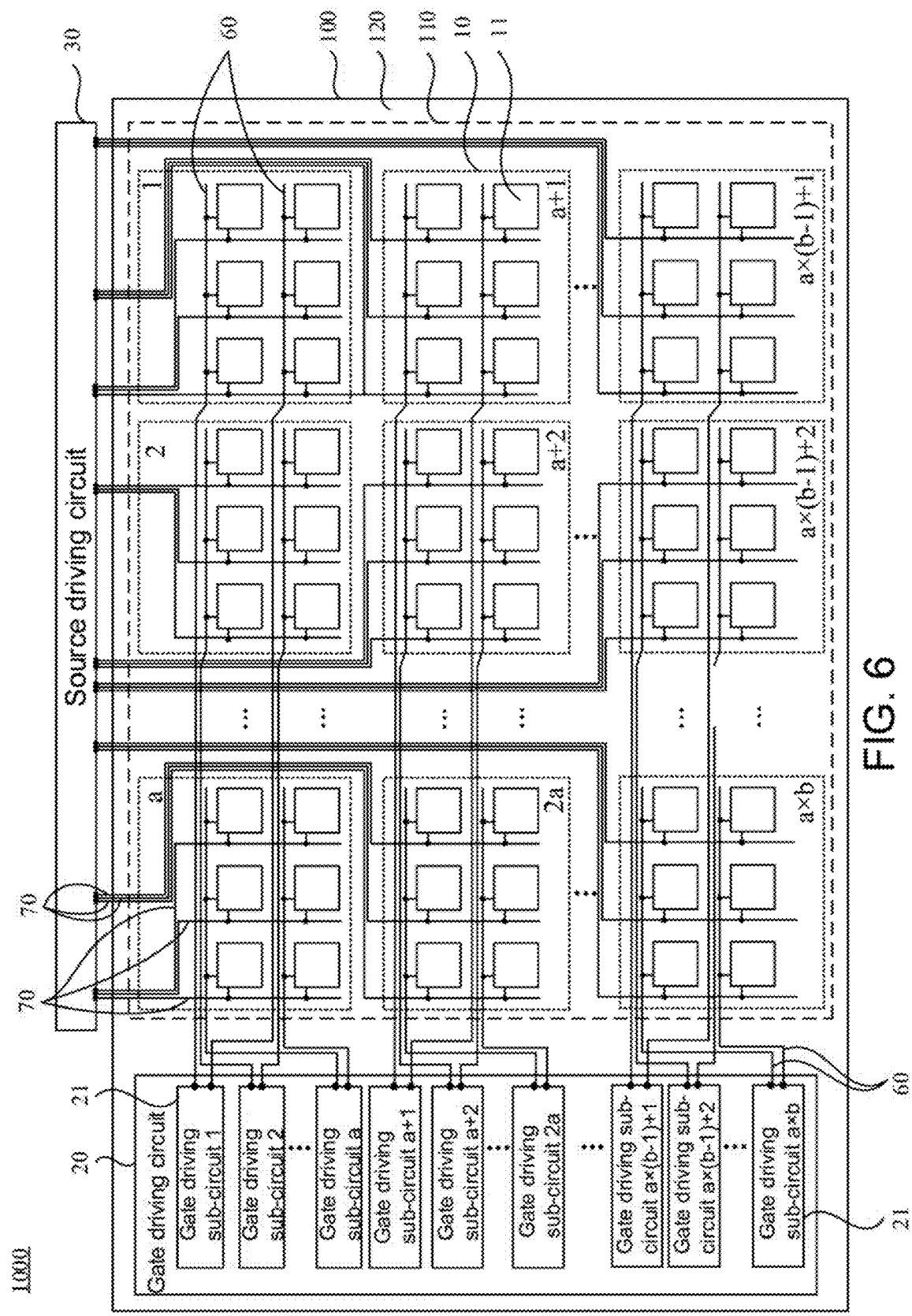
FIG. 6 is a structural schematic diagram of yet another display apparatus, in accordance with some embodiments.

Referring to FIG. 6, in some embodiments, the display apparatus 1000 further includes a source driving circuit 30. The source driving circuit 30 is configured to receive at least two groups of second control signals and at least two groups of first data signals, convert the at least two groups of first data signals into at least two groups of second data signals in one-to-one correspondence with the at least two sub-display areas 10 according to the at least two groups of second control signals, and output each group of second data signals to a plurality of sub-pixels 11 included in a corresponding sub-display area 10.

Herein, the source driving circuit 30 may be provided separately. For example, the source driving circuit 30 is a source driving chip (Source IC); or, the source driving circuit 30 may be integrated in the driving chip of the display apparatus. There may be various arrangement manners of the source driving circuit 30, which is not limited in some embodiments of the present disclosure.

In some embodiments, the display panel 100 further includes at least two groups of data lines 70 in one-to-one correspondence with the at least two sub-display areas 10. Each group of data lines 70 of the at least two groups of data lines 70 is electrically connected to a plurality of sub-pixels 11 included in a corresponding sub-display area 10. The source driving circuit 30 is electrically connected to the at least two groups of data lines 70.

For example, referring to the display apparatus 1000 shown in FIG. 6. The display apparatus 1000 is provided with the source driving circuit 30 therein. The display panel 100 includes a×b groups of data lines 70. The display area 110 of the display panel 100 includes a×b sub-display areas numbered from 1 to a×b, and the a×b groups of data lines 70 are in one-to-one correspondence with the a×b sub-display areas 10.

The sub-display area a is taken as an example. One group of data lines 70 corresponding to the sub-display area a is shown in FIG. 6. The group of data lines 70 is connected to the source driving circuit 30, and one group of second data lines output by the source driving circuit 30 is transmitted to sub-pixels 11 in the sub-display area a through the group of data lines 70.

Figure 7:
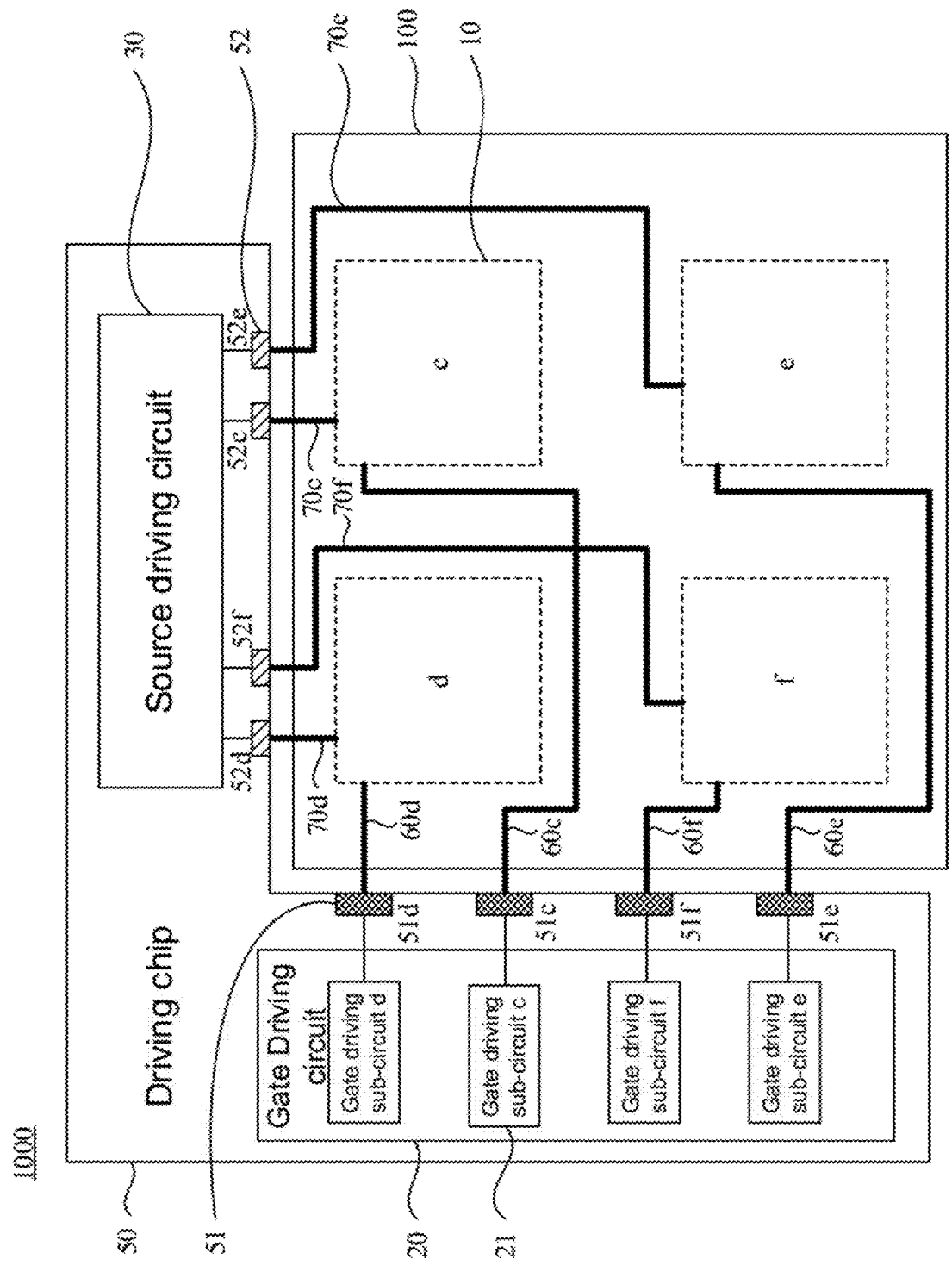
FIG. 7 is a structural schematic diagram of yet another display apparatus, in accordance with some embodiments.

Referring to FIG. 7, in some embodiments, in a case where the display apparatus 1000 includes the driving chip 50, the driving chip 50 includes the source driving circuit 30. It may be understood that the source driving circuit 30 is integrated in the driving chip 50 of the display apparatus 1000. The driving chip 50 further includes at least two data ports 52, and the source driving circuit 30 is electrically connected to the at least two groups of data lines 70 through the at least two data ports 52.

For example, referring to the display apparatus 1000 shown in FIG. 7, the display apparatus 1000 includes the driving chip 50. Both the gate driving circuit 20 and the source driving circuit 30 are integrated in the driving chip 50. The display panel 100 includes four sub-display areas 10, i.e., a sub-display area c, a sub-display area d, a sub-display area e, and a sub-display area f. The driving chip 50 further includes a driving port 51c, a driving port 51d, a driving port 51e, and a driving port 51f that are in one-to-one correspondence with the four sub-display areas 10, and a data port 52c, a data port 52d, a data port 52e and a data port 52f that are in one-to-one correspondence with the four sub-display areas 10. The source driving circuit 30 is electrically connected to one group of data lines 70c through the data port 52c, and the group of data lines 70c is electrically connected to sub-pixels 11 in the sub-display area c. A gate driving sub-circuit 21c is electrically connected to one group of gate lines 60c through the driving port 51c, and the group of gate lines 60c is electrically connected to the sub-pixels 11 in the sub-display area c. Similarly, the source driving circuit 30 is electrically connected to one group of data lines 70d through the data port 52d, and the group of data lines 70d is electrically connected to sub-pixels 11 in the sub-display area d. A gate driving sub-circuit 21d is electrically connected to one group of gate lines 60d through the driving port 51d, and the group of gate lines 60d is electrically connected to the sub-pixels 11 in the sub-display area d. The source driving circuit 30 is electrically connected to one group of data lines 70e through the data port 52e, and the group of data lines 70e is electrically connected to sub-pixels 11 in the sub-display area e. A gate driving sub-circuit 21e is electrically connected to one group of gate lines 60e through the driving port 51e, and the group of gate lines 60e is electrically connected to the sub-pixels 11 in the sub-display area e. The source driving circuit 30 is electrically connected to one group of data lines 70f through the data port 52f, and the group of data lines 70f is electrically connected to sub-pixels 11 in the sub-display area f. A gate driving sub-circuit 21f is electrically connected to one group of gate lines 60f through the driving port 51f, and the group of gate lines 60f is electrically connected to the sub-pixels 11 in the sub-display area f.

It will be noted that the four groups of gate lines 60 and the four groups of data lines 70 are schematically shown in FIG. 7 with only black lines. In practice, each group of gate lines 60 includes one or more gate lines, and each group of data lines 70 includes one or more data lines. In addition, FIG. 7 only shows boundaries of the sub-display areas c, d, e, and f, does not show the sub-pixels 11 included in each sub-display area 10, and also does not show a connection relationship between each group of gate lines 60 and the sub-pixels 11 in the corresponding sub-display area 10 and a connection relationship between each group of data lines 70 and the sub-pixel 11 in the corresponding sub-display area 10. For parts not shown above, corresponding structures and descriptions in FIG. 5, 6, 8 or 9 may be referred to.

In some embodiments of the present disclosure, there may be various connection relationships between the sub-pixels 11 in each sub-display area 10 and a corresponding group of gate lines 60 and a group of data lines 70, as long as required signals may be transmitted to the sub-pixels 11 in the sub-display area 10 through the corresponding group of gate lines and the corresponding group of data lines, which is not limited in some embodiments of the present disclosure.

Figure 8:
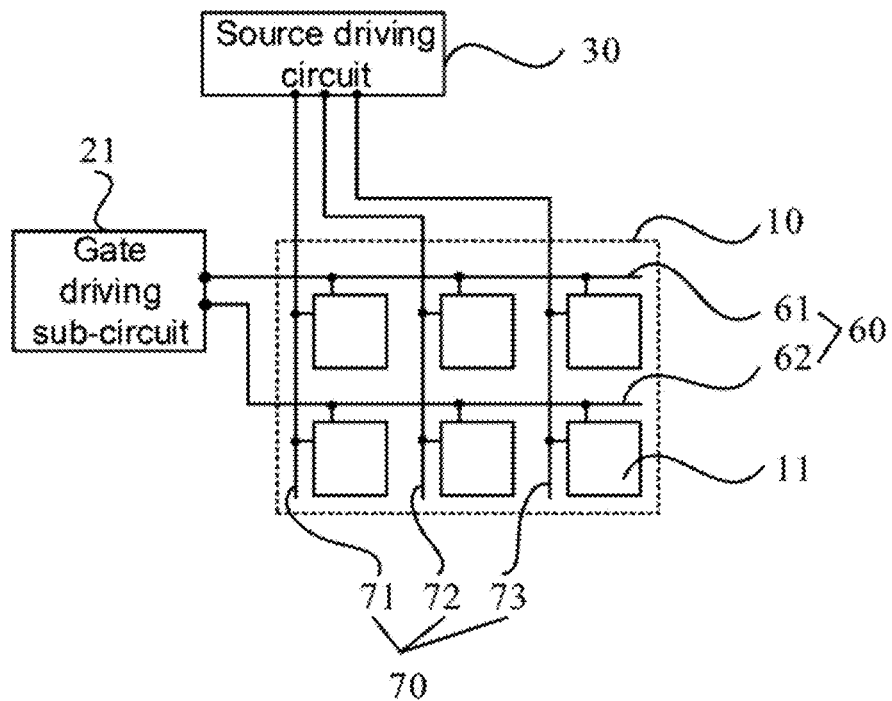
FIG. 8 is a schematic diagram showing a connection between sub-pixels in a same sub-display area and both a corresponding group of gate lines and a corresponding group of data lines, in accordance with some embodiments.

Referring to FIG. 8, in some embodiments, each sub-display area 10 includes the sub-pixels 11 in plurality of rows and a plurality of columns. In a case where the display panel 100 includes the at least two groups of gate lines 60 in one-to-one correspondence with the at least two sub-display areas 10 and the at least two groups of data lines 70 in one-to-one correspondence with the at least two sub-display areas 10, for each sub-display area 10, a number of gate lines included in one group of gate lines 60 corresponding to the sub-display area 10 is equal to a number of rows of the sub-pixels 11 included in the sub-display area 10, and gate lines of the group of gate lines 60 corresponding to the sub-display area 10 are electrically connected to rows of the sub-pixels 11 included in the sub-display area 10 in a one-to-one correspondence manner. A number of data lines included in the group of data lines 70 corresponding to the sub-display area 10 is equal to a number of columns of the sub-pixels 11 included in the sub-display area 10, and data lines of the group of data lines 70 corresponding to the sub-display area 10 are electrically connected to columns of the sub-pixels 11 included in the sub-display area 10 in a one-to-one correspondence manner.

One sub-display area 10 shown in FIG. 8 is taken as an example. The sub-display area 10 includes six sub-pixels 11 in two rows and three columns, and a gate driving sub-circuit 21 and a source driving circuit that correspond to the sub-display area 10 are shown in FIG. 8. The gate driving sub-circuit 21 is electrically connected to the six sub-pixels 11 through one group of gate lines 60, and the group of gate lines 60 includes two gate lines, i.e., a first gate line 61 and a second gate line 62. The first gate line 61 is electrically connected to a first row of sub-pixels in the sub-display area 10, and the gate driving sub-circuit 21 inputs a corresponding gate driving signal to the first row of sub-pixels through the first gate line 61. The second gate line 62 is electrically connected to a second row of sub-pixels in the sub-display area 10, and the gate driving sub-circuit 21 inputs a corresponding gate driving signal to the second row of sub-pixels through the second gate line 62. Since each row of sub-pixels is electrically connected to a different gate line separately, it is possible to realize a progressive scanning driving for the sub-pixels 11 in the sub-display area 10 by controlling the timing of gate driving signals output by the first gate line 61 and the second gate line 62. The source driving circuit 30 is electrically connected to the six sub-pixels 11 through one group of data lines 70. The group of data lines 70 includes three data lines, i.e., a first data line 71, a second data line 72, and a third data line 73 from left to right. The first data line 71 is electrically connected to a first column of sub-pixels in the sub-display area 10, and the source driving circuit 30 inputs a corresponding second data signal to the first column of sub-pixels through the first data line 71. The second data line 72 is electrically connected to a second column of sub-pixels in the sub-display area 10, and the source driving circuit 30 inputs a corresponding second data signal to the second column of sub-pixels through the second data line 72. The third data line 73 is electrically connected to a third column of sub-pixels in the sub-display area 10, and the source driving circuit 30 inputs a corresponding second data signal to the third column of sub-pixels through the third data line 73.

Herein, the number of gate lines included in one group of gate lines 60 corresponding to each sub-display area 10 is equal to the number of rows of the sub-pixels 11 included in the sub-display area 10, and gate lines of the group of gate lines 60 corresponding to the sub-display area 10 are electrically connected to rows of the sub-pixels 11 included in the sub-display area 10 in a one-to-one correspondence manner. Therefore, the progressive scanning driving for the sub-pixels 11 in each sub-display area 10 may be realized by controlling the timing of one group of gate driving signals output by the gate driving sub-circuit 21. In this case, the number of data lines included in one group of data lines 70 corresponding to the sub-display area 10 is equal to the number of columns of the sub-pixels 11 included in the sub-display area 10, and data lines of the group of data lines 70 corresponding to the sub-display area 10 are electrically connected to columns of the sub-pixels 11 included in the sub-display area 10 in a one-to-one correspondence manner. In this way, a display function is realized, and it is beneficial to reduce the number of data lines corresponding to each sub-display area 10, thereby simplifying the wiring in the display apparatus 1000.

Figure 9:
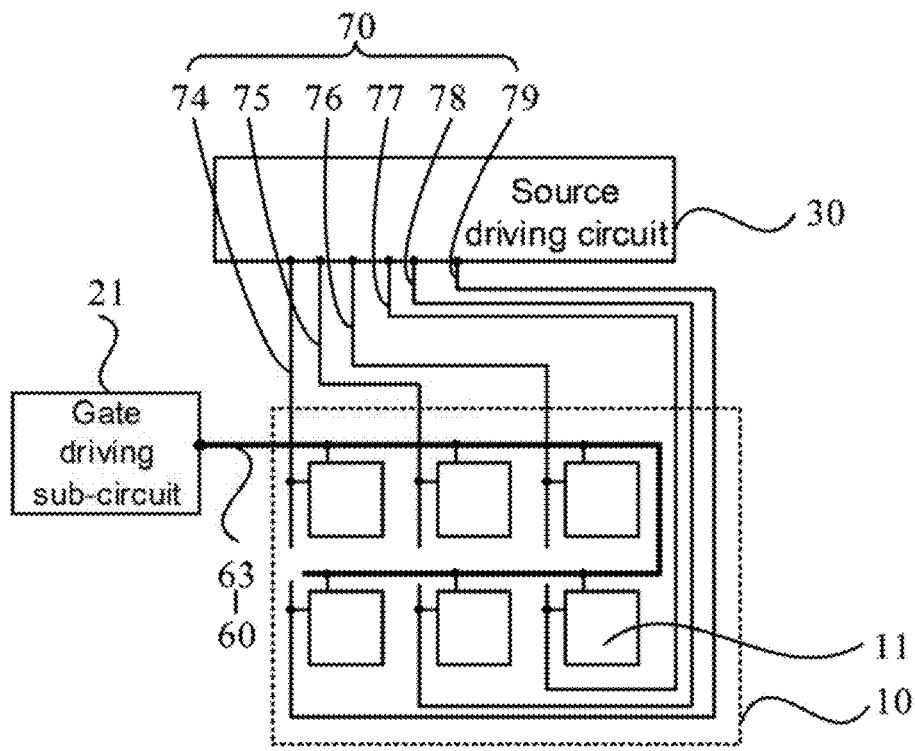
FIG. 9 is a schematic diagram showing another connection between sub-pixels in a same sub-display area and both a corresponding group of gate lines and a corresponding group of data lines, in accordance with some embodiments, in accordance with some embodiments.

Referring to FIG. 9, in some embodiments, in a case where the display panel 100 includes the at least two groups of gate lines 60 in one-to-one correspondence with the at least two sub-display areas 10 and the at least two groups of data lines 70 in one-to-one correspondence with the at least two sub-display areas 10, for each sub-display area 10, one group of gate lines 60 corresponding to the sub-display area 10 includes one gate line, and the gate line corresponding to the sub-display area 10 is electrically connected to the plurality of sub-pixels 11 included in the sub-display area 10. The number of data lines included in the group of data lines 70 corresponding to the sub-display area 10 is equal to the number of the sub-pixels 11 included in the sub-display area 10, and data lines of the group of data lines 70 corresponding to the sub-display area 10 are electrically connected to the plurality of sub-pixels 11 included in the sub-display area 10 in a one-to-one correspondence manner.

One sub-display area 10 shown in FIG. 9 is taken as an example. The sub-display area 10 includes six sub-pixels 11 in two rows and three columns, and a gate driving sub-circuit 21 and a source driving circuit 30 that correspond to the sub-display area 10 are shown in FIG. 9. The gate driving sub-circuit 21 is electrically connected to the six sub-pixels 11 through one group of gate lines 60. The group of gate lines 60 includes one third gate line 63, and the third gate line 63 is electrically connected to all the sub-pixels 11 in the sub-display area 10. The gate driving sub-circuit 21 inputs a corresponding gate driving signal to the sub-pixels 11 through the third gate line 63, thereby realizing a simultaneous driving for all the sub-pixels 11 in the sub-display area 10. The source driving circuit 30 is electrically connected to the six sub-pixels 11 through one group of data lines 70. The group of data lines 70 includes six data lines, i.e., a fourth data line 74, a fifth data line 75, a sixth data line 76, a seventh data line 77, an eighth data line 78 and a ninth data line 79. The six data lines are electrically connected to the six sub-pixels 11 in a one-to-one correspondence manner. The source driving circuit 30 inputs corresponding second data signals to the six sub-pixels 11 through the six data lines respectively.

Herein, the sub-pixel 11s in each sub-display area 10 are electrically connected to a same gate line, and each sub-pixel 11 is electrically connected to one data line individually. Thus, the simultaneous driving for the sub-pixels 11 in each sub-display area 10 may be realized, which is beneficial to reduce a refresh time of each frame of the image on each sub-display area 10 and increase the frame rate.

Figure 10:
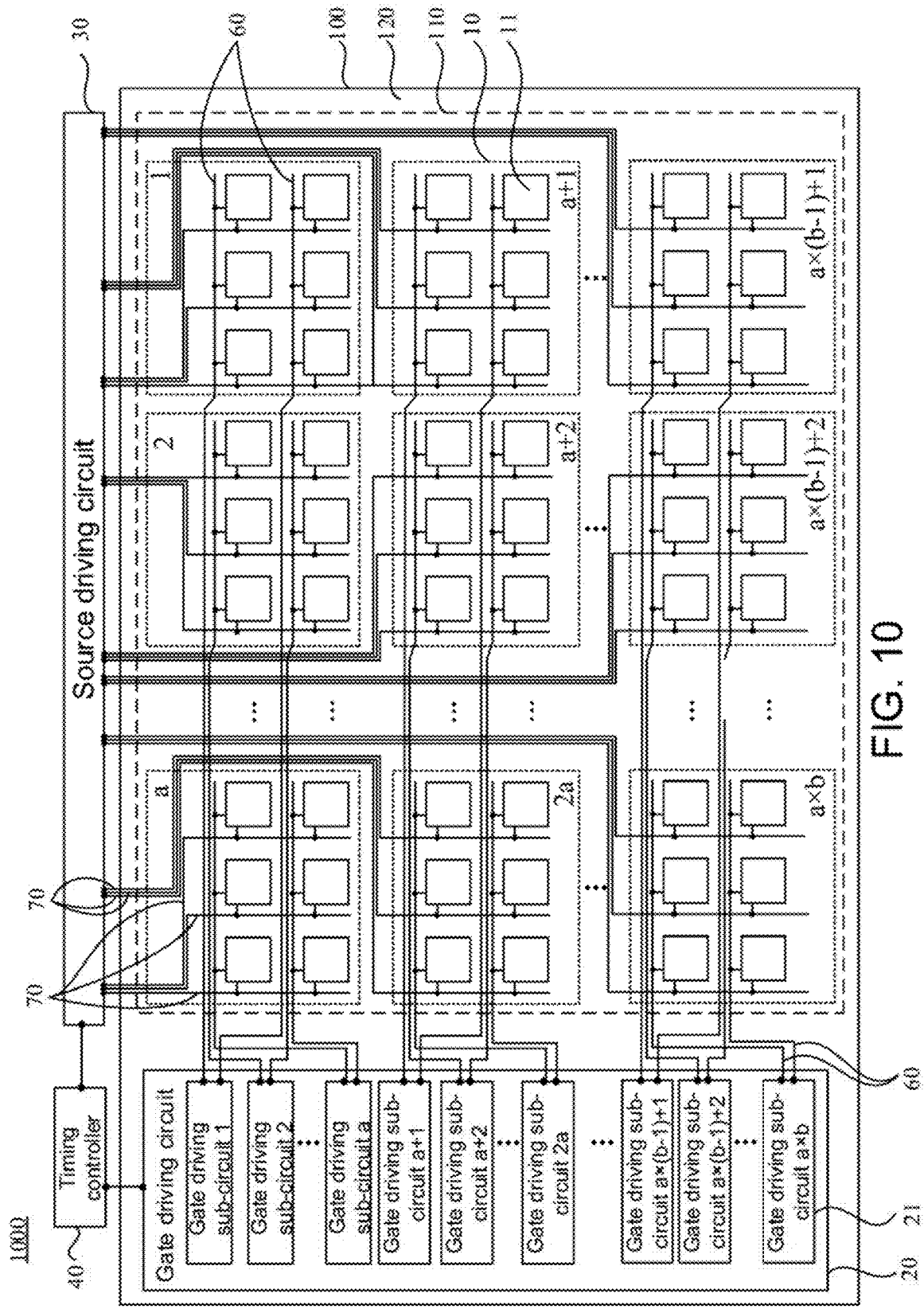
FIG. 10 is a structural schematic diagram of yet another display apparatus, in accordance with some embodiments.

Referring to FIG. 10, in some embodiments, the display apparatus 1000 further includes a timing controller 40 electrically connected to the gate driving circuit 20 and the source driving circuit 30. Herein, the timing controller 40 is, for example, provided separately (as shown in FIG. 10), or the timing controller 40 is integrated in the driving chip 50, which is not limited in some embodiments of the present disclosure.

The timing controller 40 is configured to receive the source signals, and generate at least two groups of first control signals, at least two groups of second control signals, and at least two groups of first data signals according to the source signals, output the at least two groups of first control signals to the gate driving circuit 20, and output the at least two groups of second control signals and the at least two groups of first data signals to the source driving circuit 30.

The display apparatus 1000 shown in FIG. 10 is taken as an example below to describe a principle of processing signals in some embodiments of the present disclosure in detail. Referring to FIG. 10, the display area 110 of the display panel 100 includes a×b sub-display areas 10 numbered from 1 to a×b and arranged in a matrix. Each sub-display area 10 includes the sub-pixels in m rows and n columns, that is, a resolution of each sub-display area 10 is m×n (for example, the resolution of each sub-display area 10 in FIG. 10 is 2×3).

Figure 11:
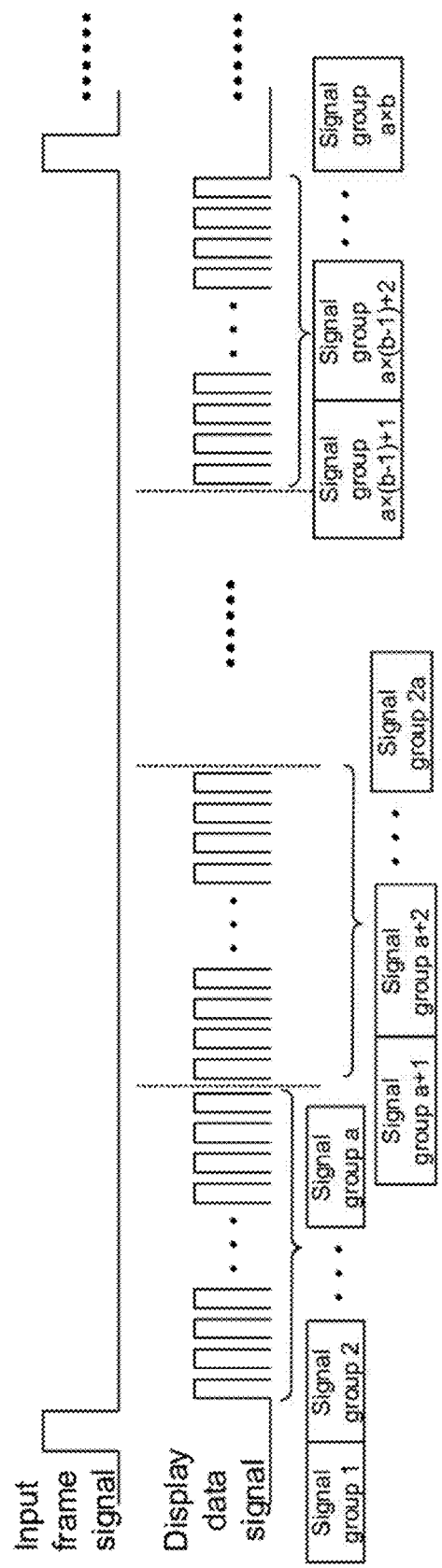
FIG. 11 is a timing signal diagram of source signals input to a timing controller, in accordance with some embodiments.

FIG. 11 is a timing signal diagram of the source signals input to the timing controller 40. The source signals at least include signals that characterize timing and display data. Signals that characterize timing include various timing signals, such as a frame rate signal, a row clock signal, and a column clock signal. Different types of timing signals have different codes. FIG. 11 illustrates an example of only an input frame signal, but the embodiments of the present disclosure does not limit to this. For the source signals, FIG. 11 shows a signal line that abstractly characterizes the timing and a signal line that abstractly characterizes the display data. However, in the practical codes of the source signals, there are various signals, and a signal that characterizes the timing may also be internally installed in codes of signals that characterize the display data, which is not limited in some embodiments of the present disclosure.

Referring to FIG. 11, in the input frame signal, the time elapsed between two adjacent pulses is one frame period. In each frame period, the signals that characterize the display data in the source signals are input to the timing controller 40 according to a certain timing. The signals that characterize the display data include display data signals corresponding to images to be displayed on the a×b sub-display areas 10 in FIG. 10 in sequence. For example, as shown in FIG. 11, a signal group 1 is a display data signal corresponding to the sub-display area 1, and a signal group a is a display data signal corresponding to the sub-display area a, and a signal group a×b is a display data signal corresponding to the sub-display area a×b, and so on. A display data signal corresponding to each sub-display area 10 is sequentially input to the timing controller 40 in an order corresponding to the sub-display areas numbered from 1 to a×b.

The timing controller 40 stores the input signals, and reads the display data signals corresponding to the sub-display areas 10 according to a certain timing, and then arranges and converts the display data signals to generate a×b groups of first control signals corresponding to the a×b sub-display areas 10 respectively, a×b groups of second control signals corresponding to the a×b sub-display areas 10 respectively, and a×b groups of first data signals corresponding to the a×b sub-display areas 10 respectively, and outputs the a×b groups of first control signals to the a×b gate driving sub-circuits 21 in the gate driving circuit 20 in a one-to-one correspondence manner. Optionally, in a case where the gate driving sub-circuit 21 is the GOA sub-circuit, one group of first control signals input to any gate driving sub-circuit 21 includes one group of clock signals (CLK signal group). The group of clock signals includes one or more clock signals required to control the GOA sub-circuit, and the group of dock signals is configured to control an opening sequence and time of each row of sub-pixels 11 in a corresponding sub-display area 10.

The timing controller 40 further outputs the a×b groups of second control signals and the a×b groups of first data signals to the source driving circuit 30. A second control signal includes, for example, a timing control signal. A first data signal is, for example, a data signal related to an image displayed on each sub-display area 10.

Figure 12:
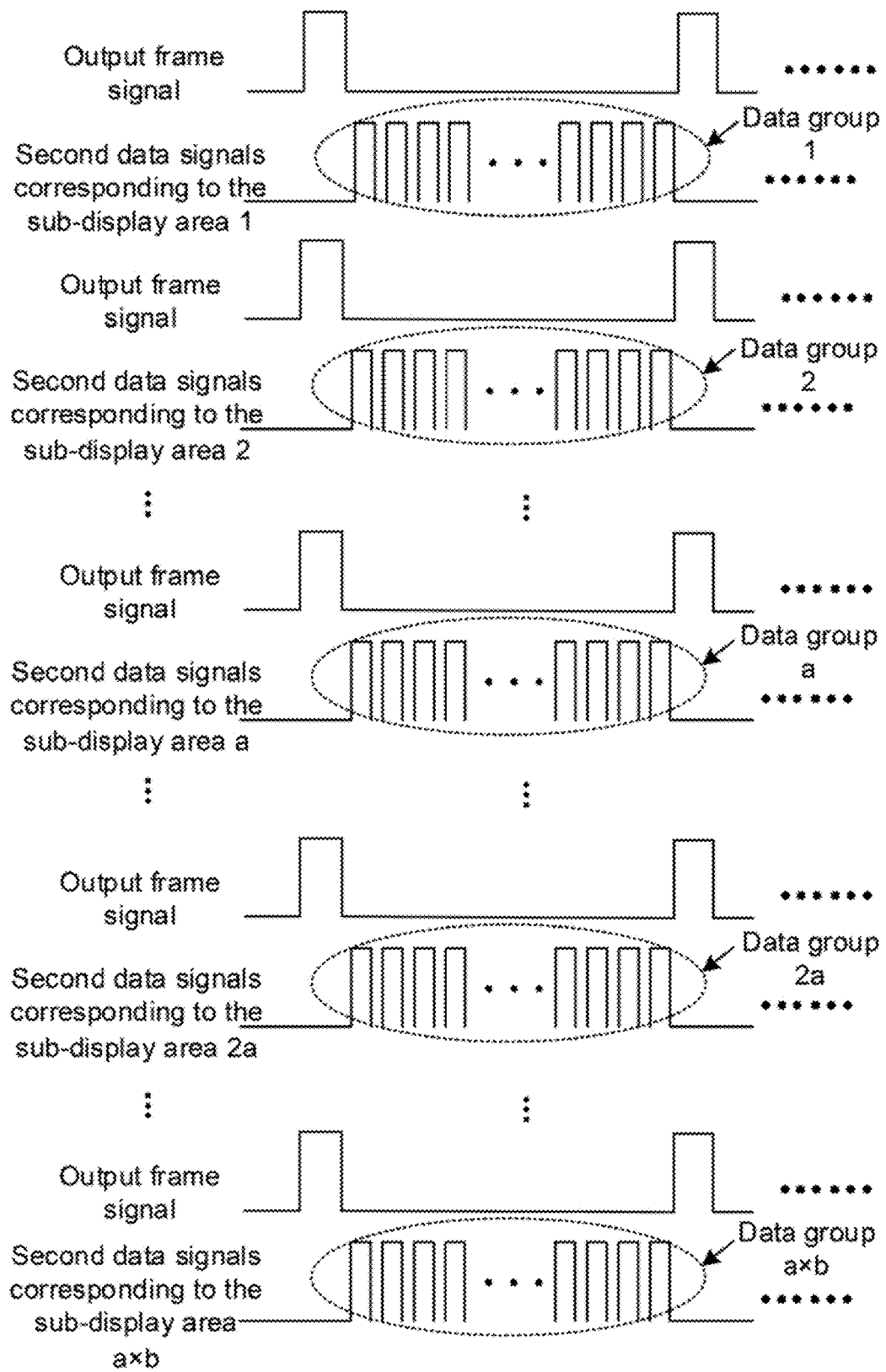
FIG. 12 is a timing signal diagram of a plurality of groups of second data signals corresponding to FIG. 11 being output to sub-display areas.

After receiving the a×b groups of second control signals and the a×b groups of first data signals, the source driving circuit 30 converts the received a×b groups of first data signals according to the a×b groups of second control signals. For example, groups of first data signals are processed by signal selection, signal arrangement, digital-to-analog conversion, storage to form a×b groups of second data signals. Then, the source driving circuit 30 outputs the a×b groups of second data signals to the corresponding sub-display areas 10 according to a certain timing. For example, referring to FIG. 12, FIG. 12 is a diagram showing a theoretical principle where a plurality of groups of second data signals corresponding to FIG. 11 are output to the sub-display areas 10. In FIG. 12, a data group 1 is a group of second data signals corresponding to the sub-display area 1, and a data group a is a group of second data signals corresponding to the sub-display area a, and the data group a×b is a group of second data signals corresponding to the sub-display area a×b, and so on. The source driving circuit 30 outputs the groups of second data signals to the corresponding sub-display areas 10 in a one-to-one correspondence manner, and each output group of second data signals includes, for example, a driving current signal or a driving voltage signal.

The resolution of each sub-display area 10 in the a×b sub-display areas is m×n. In a case where the frame rate of each sub-display area 10 is the same, output frame signals corresponding to all the sub-display areas 10 are synchronized (as shown in FIG. 12), and an output resolution per frame of the source driver circuit 30 is (m×a×b)×n. In a case where the source driving circuit 30 is integrated in the driving chip 50, an output resolution of each data port 52 is m×n.

In a case where the frame rate of each sub-display area 10 is different, the output frame signals corresponding to all the sub-display areas 10 are asynchronous. For example, in a case where the frame rate of each sub-display area 10 is different, in the source signals, signals that characterize the display data may be input to the timing controller 40 according to one timing or one frame rate, and then the plurality of groups of second data signals are output from the timing controller 40 according to another timing or another frame rate. The row effective time and column effective time that correspond to different sub-display areas 10 may be different, so that different sub-display areas 10 may display images at different frame rates.

The display apparatus 1000 in some embodiments of the present disclosure is, for example, an OLED display apparatus, a Mini LED display apparatus, a Micro LED display apparatus, an LCD display apparatus, an electronic paper, a mobile phone, a tablet computer, a television, a displayer, a notebook computer, a digital photo frame, a navigator or any product or component that has a display function, which is not limited in some embodiments of the present disclosure.

Figure 13:
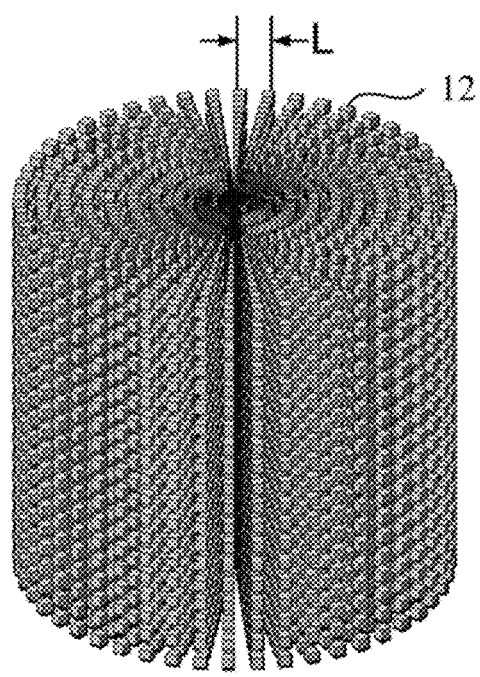
FIG. 13 is a schematic diagram showing a base model of a rotating display apparatus, in accordance with some embodiments.
Figure 14:
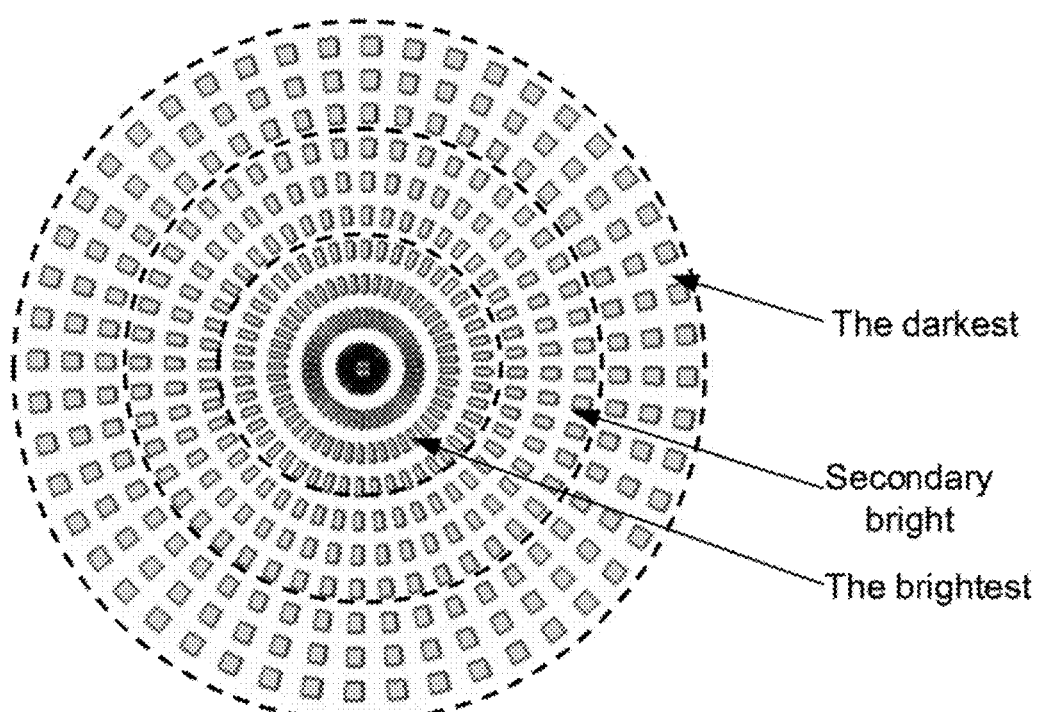
FIG. 14 is a diagram showing an effect of being bright inside and dark outside of a display image before adjusting a display brightness of a display apparatus.

The display apparatus 1000 in any of the embodiments may be applied to application scenarios such as the AR display, the VR display, or the rotating display. In some examples, a basic model of a rotating display apparatus 1000 may be referred to FIGS. 13 to 15. The rotating display apparatus includes a rotation axis 200 (referred to FIG. 15) and the display panel 100. The display panel 100 is capable of rotating around the rotation axis 200 rapidly, so as to form a cylindrical three-dimensional display space with a certain diameter and height (referred to FIG. 13). When the cylindrical three-dimensional display space is formed, a plurality of two-dimensional dot matrix pictures may be sequentially displayed at different spatial positions.

The display panel 100 of the rotating display apparatus includes a plurality of sub-pixels 11 arranged in rows and columns at equal intervals. For clarity, a size and an adjacent space of each sub-pixel 11 are enlarged in FIG. 13. During a rotation of the display panel 100 around the rotation axis 200 for display, due to a persistence of vision effect of the human eyes, all the sub-pixels 11 scattered in the space will be correspondingly regarded as voxels (a voxel being the smallest component of a three-dimensional image in a three-dimensional space) that "residue" in the space when they are displayed. In addition, a plurality of voxels 12 correspondingly formed by a plurality of sub-pixels 11 in a same row and different columns are distributed on circles with a same height and different radiuses, and a plurality of voxels 12 correspondingly formed by a plurality of sub-pixels 11 in a same column and different rows are distributed on circles with a same radius and different heights, all the sub-pixels form a three-dimensional voxel dot matrix together.

During the rotation of the display panel 100 around the rotation axis 200 for display, for an arc length L stroked by any sub-pixel 11 in a certain unit time, the greater a perpendicular distance between the sub-pixel 11 and the rotation axis 200 is, the greater the arc length L is. Therefore, the voxels 12 in the three-dimensional voxel dot matrix have a same density in a direction parallel to the rotation axis 200, and have different densities in a direction perpendicular to the rotation axis 200. In addition, the voxels 12 in the three-dimensional voxel dot matrix present a distribution characteristic of being dense inside and sparse outside. That is, the voxels 12 become increasingly sparse along a direction perpendicular to and away from the rotation axis 200. In this case, if the frame rates of all the sub-pixels 11 in the display panel 100 are synchronized, a viewed image will appear bright inside and dark outside (referred to FIG. 14). Thus, it is hard to realize voxel uniformity, thereby affecting the viewing experience of the users.

Based on this, the display apparatus 1000 provided by some embodiments of the present disclosure further includes the rotation axis 200, and the display panel 100 is configured to be rotatable around the rotation axis 200.

Figure 15:
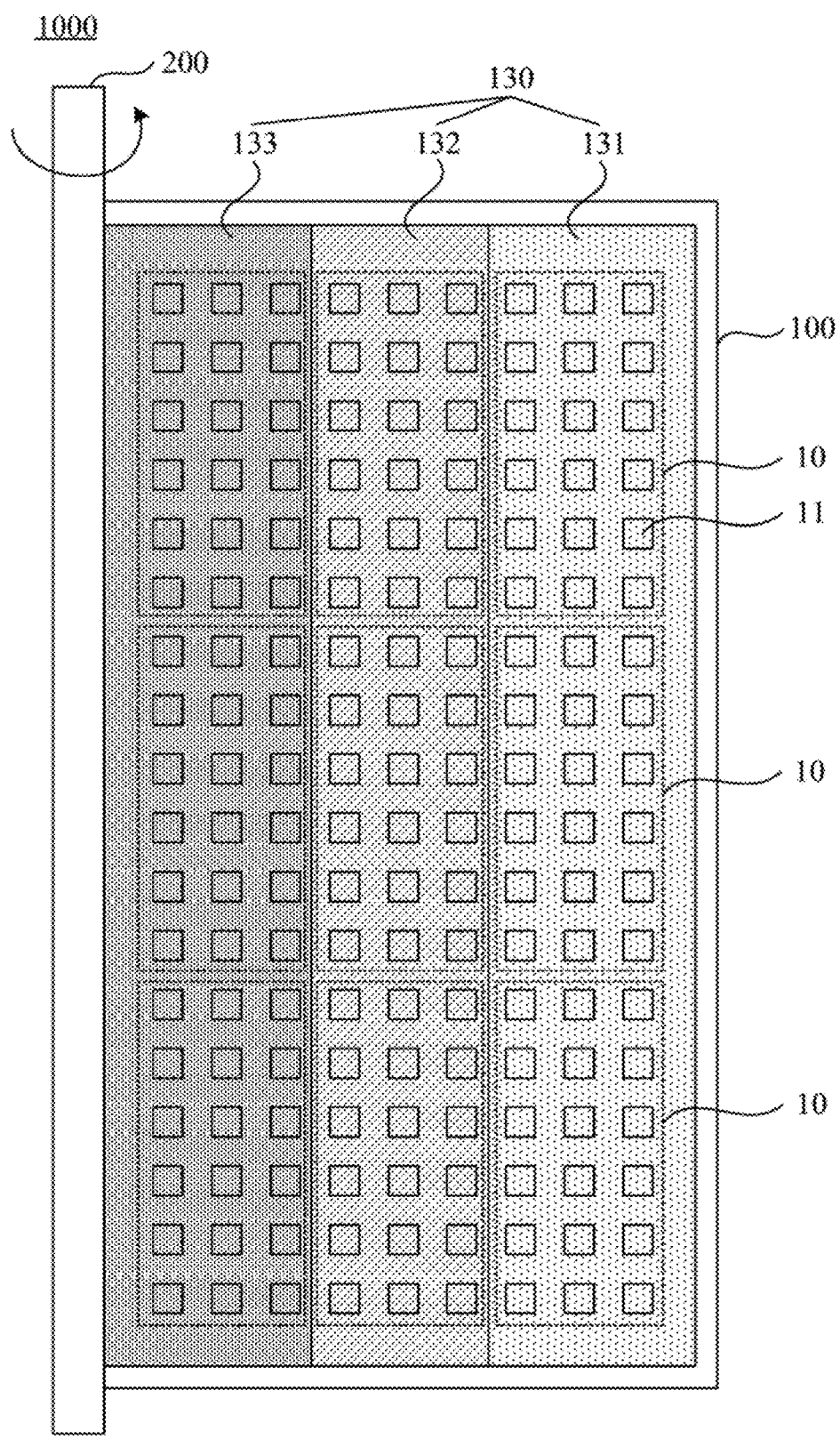
FIG. 15 is a structural schematic diagram of yet another display apparatus, in accordance with some embodiments.

Herein, referring to FIG. 15, the rotation axis 200 may be disposed on an edge of the display panel 100, and the display panel 100 is capable of rotating around the rotation axis 200 (referred to a direction indicated by the arrow in FIG. 15). Or, referring to FIG. 16, the rotation axis 200 may be disposed at a central axis of the display panel 100, and the display panel 100 is capable of rotating around the rotation axis 200 (referred to a direction indicated by the arrow in FIG. 16). Some embodiments of the present disclosure do not limit thereto.

The display panel 100 has at least two brightness adjustment areas 130, a length direction of each brightness adjustment area 130 of the at least two brightness adjustment areas 130 is parallel to the rotation axis 200, and the at least two brightness adjustment areas 130 are arranged in parallel along a direction perpendicular to the rotation axis 200. Each brightness adjustment area 130 includes at least one sub-display area 10. For example, referring to FIG. 15, the display apparatus 1000 includes the display panel 100 and the rotation axis 200 disposed at the edge of the display panel 100.

The display panel 100 includes three brightness adjustment areas 130, i.e., 131, 132, and 133. The length direction of each brightness adjustment area 130 is parallel to the rotation axis 200, and the three brightness adjustment areas 130 are arranged in parallel along the direction perpendicular to the rotation axis 200. Each brightness adjustment area 130 includes three sub-display areas 10.

The source driving circuit 30 of the rotating display apparatus is further configured to adjust groups of second data signals to be output to sub-display areas 10 in a corresponding brightness adjustment area 130 separately according to a preset brightness parameter of each brightness adjustment area 130, so that an average display brightness of the at least two brightness adjustment areas 130 are the same or approximately the same. The brightness parameter of each brightness adjustment area 130 increases sequentially along the direction perpendicular to the rotation axis 200 and progressively away from the rotation axis 200. Herein, a display brightness refers to an overall brightness of the display image seen by the human eyes, and an average display brightness of any brightness adjustment area 130 refers to an overall brightness of the image displayed on the brightness adjustment area 130 seen by the human eyes.

There may be many types of brightness parameters according to different types of display apparatuses. For example, in a case where the display apparatus 1000 is a current-driven display apparatus such as the OLED display apparatus, the Mini LED display apparatus, or the Micro LED display apparatus, the brightness parameter is, for example, a duty ratio coefficient of each second data signal in each group of second data signal corresponding to each sub-display area 10 in a target brightness adjustment area 130. In a case where the display apparatus 1000 is a voltage-driven display apparatus such as the LCD display apparatus, the brightness parameter is, for example, a gray coefficient of each second data signal in each group of second data signals corresponding to each sub-display area 10 in the target brightness adjustment area 130.

The display panel 100 is divided into different brightness adjustment areas 130 in some embodiments of the present disclosure. On the basis of driving each sub-display area 10 in the display panel 100 separately, each group of second data signals to be output to each sub-display area 10 of the corresponding brightness adjustment area 130 is adjusted separately, and the brightness parameter of each brightness adjustment area 130 is set to increase along the direction perpendicular to and away from the rotation axis 200. Therefore, the average display brightness of each of the different brightness adjustment areas 130 is adjusted, so that an average display brightness of a brightness adjustment area 130 closer to the rotation axis 200 as viewed by the human eyes is proximate to or equal to an average display brightness of a brightness adjustment area 130 further away from the rotation axis 200. Thus, a case where the three-dimensional voxel dot matrix of the display apparatus is bright inside and dark outside during displaying the image is improved, and the brightness of the stereoscopic image viewed by a viewer is more uniform, thereby realizing a better voxel uniformity effect of the rotating display apparatus.

Figure 17:
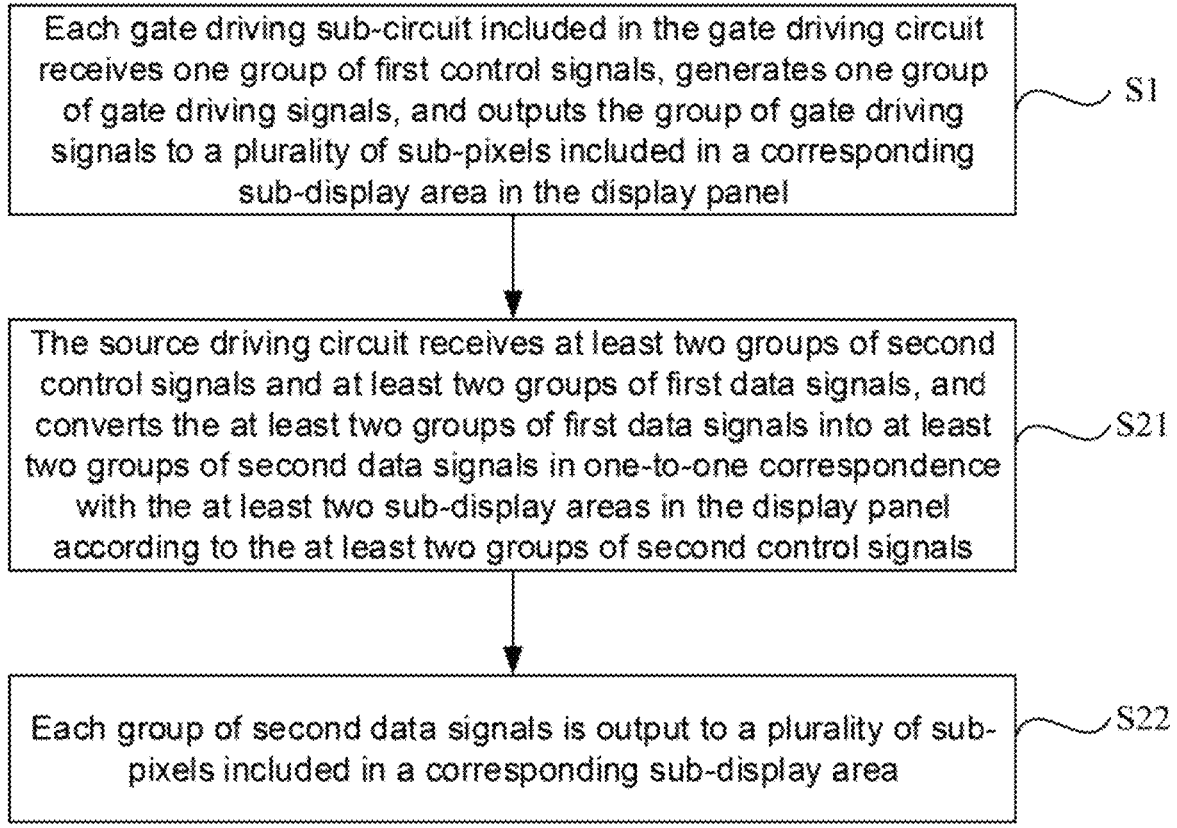
FIG. 17 is a flow diagram of a driving method of a display apparatus, in accordance with some embodiments.

Referring to FIG. 17, some embodiments of the present disclosure provide a driving method of a display apparatus applied to the display apparatus 1000 of any of the above embodiments. The driving method includes S1.

In S1, each gate driving sub-circuit 21 included in the gate driving circuit 20 receives one group of first control signals, generates one group of gate driving signals, and outputs the group of gate driving signals to a plurality of sub-pixels 11 included in a corresponding sub-display area 10 in the display panel 100.

In the driving method, the corresponding sub-display area 10 is driven by one gate driving sub-circuit 21, so that each sub-display area 10 may be driven separately, and sub-pixels 11 in different sub-display areas 10 may be scanned synchronously in one frame period. In addition, the different sub-display areas 10 may display images at different frame rates, and the different sub-display areas 10 may be asynchronously scanned and refreshed.

In some embodiments, in a case where the display apparatus 1000 includes the source driving circuit 30, with continuous reference to FIG. 17, the driving method in the embodiments of the present disclosure further includes S21 and S22.

In S21, the source driving circuit 30 receives at least two groups of second control signals and at least two groups of first data signals, and converts the at least two groups of first data signals into at least two groups of second data signals in one-to-one correspondence with the at least two sub-display areas 10 in the display panel 100 according to the at least two groups of second control signals.

In S22, each group of second data signals is output to a plurality of sub-pixels 11 included in a corresponding sub-display area 10.

Figure 18:
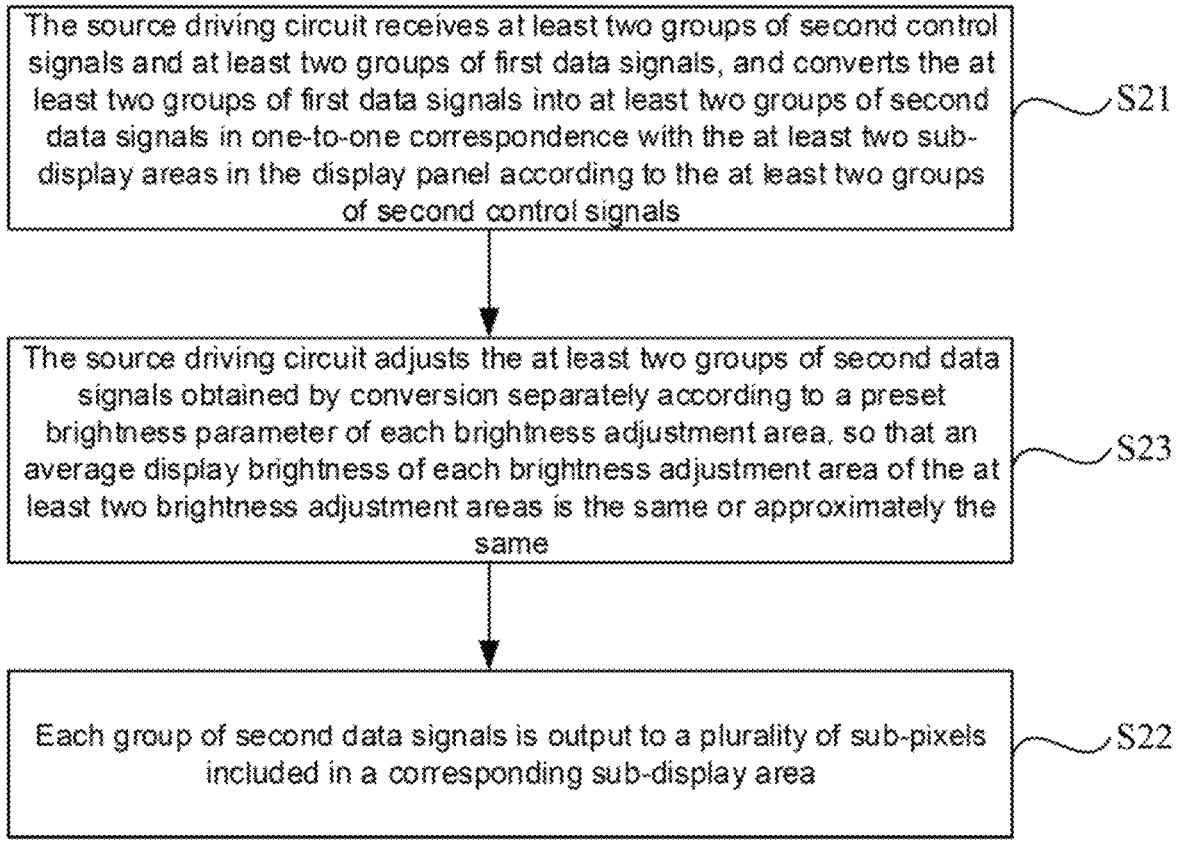
FIG. 18 is a flow diagram of another driving method of a display apparatus, in accordance with some embodiments.

In some embodiments, in a case where the display apparatus 1000 is a rotating display apparatus, the display apparatus 1000 further includes a rotation axis 200, and the display panel 100 is configured to be rotatable around the rotation axis 200. The display panel 100 has at least two brightness adjustment areas 130, and a length direction of each brightness adjustment area 130 of the at least two brightness adjustment areas 130 is parallel to the rotation axis 200, and the at least two brightness adjustment areas 130 are arranged in parallel along a direction perpendicular to the rotation axis 200. Each brightness adjustment area 130 includes at least one sub-display area 10. Referring to FIG. 18, before each group of second data signals is output to the plurality of sub-pixels 11 included in the corresponding sub-display area 10, the driving method in the embodiments of the present disclosure further includes S23.

In S23, the source driving circuit 30 adjusts the at least two groups of second data signals obtained by conversion separately according to a preset brightness parameter of each brightness adjustment area 130, so that an average display brightness of each brightness adjustment area 130 of the at least two brightness adjustment areas 130 is the same or approximately the same. The brightness parameter of each brightness adjustment area 130 increases sequentially along a direction perpendicular to the rotation axis 200 and progressively away from the rotation axis 200.

It is worth mentioning that the preset brightness parameter of each brightness adjustment area 130 is stored, for example, in the source driving circuit 30, so that the brightness parameter may be invoked by the source driving circuit 30.

There may be many types of brightness parameters according to different types of display apparatuses.

In some embodiments, the display apparatus 1000 includes a current-driven display apparatus such as an OLED display apparatus, a Mini LED display apparatus, or a Micro LED display apparatus. In the above display apparatus, an effective brightness of each sub-pixel 11 in one frame period is related to a duty ratio of a second data signal received by the sub-pixel 11. The duty ratio of the second data signal determines an effective lighting time of a light-emitting device in a corresponding sub-pixel 11, and the effective lighting time of a plurality of sub-pixels 11 in each brightness adjustment area 130 corresponds to the overall brightness (average display brightness) of the image displayed on the brightness adjustment area 130. Therefore, duty ratios of second data signals corresponding to the plurality of sub-pixels 11 in the same brightness adjustment area 130 are adjusted according to a certain ratio, and the average display brightness of the brightness adjustment area 130 may be adjusted. It will be noted that the frame rates of the sub-display areas 10 included in the same brightness adjustment area 130 are synchronized, and the frame rates corresponding to different brightness adjustment areas 130 may be the same or different.

Based on this, the brightness parameter includes a duty ratio coefficient of each second data signal in each group of second data signals obtained by conversion and corresponding to each sub-display area 10 in a target brightness adjustment area 130. Along the direction perpendicular to the rotation axis 200 and progressively away from the rotation axis 200, a ratio of duty ratio coefficients of brightness adjustment areas 130 is inversely related to a ratio of the average display brightness of the brightness adjustment areas 130 in a case where the at least two groups of second data signals obtained by conversion are not adjusted separately. That is to say, in a case where the groups of second data signals obtained by conversion are not adjusted separately, the greater the average display brightness of the target brightness adjustment area 130 is, the smaller the duty ratio coefficient corresponding to the target brightness adjustment area 130 during adjustment is. In the case where the groups of second data signals obtained by conversion are not adjusted separately, the darker the average display brightness of the target brightness adjustment area 130 is, the greater the duty ratio coefficient corresponding to the target brightness adjustment area 130 during adjustment is. After such adjustment, an average display brightness of a brightness adjustment area 130 closer to the rotation axis 200 viewed by the human eyes is proximate to or equal to an average display brightness of a brightness adjustment area 130 further away from the rotation axis 200. Thus, the case where the three-dimensional voxel dot matrix of the display apparatus is bright inside and dark outside during displaying an image is improved, and the brightness of the stereoscopic image viewed by the viewer is more uniform, thereby realizing a good voxel uniformity effect of the rotating display apparatus.

Figure 19:
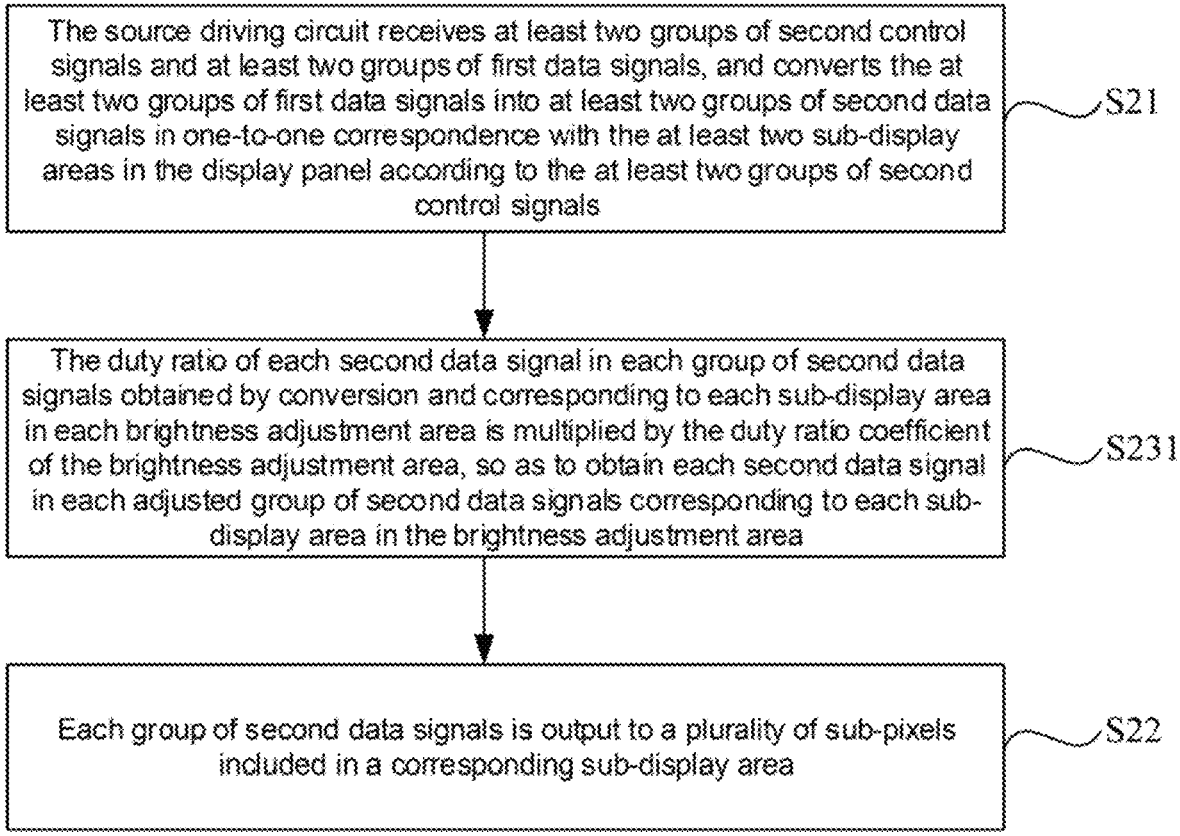
FIG. 19 is a flow diagram of yet another driving method of a display apparatus, in accordance with some embodiments.

In some embodiments, referring to FIG. 19, the at least two groups of second data signals obtained by conversion are adjusted separately according to the preset brightness parameter of each brightness adjustment area 130, which includes S231.

In S231, the duty ratio of each second data signal in each group of second data signals obtained by conversion and corresponding to each sub-display area 10 in each brightness adjustment area 130 is multiplied by the duty ratio coefficient of the brightness adjustment area 130, so as to obtain each second data signal in each adjusted group of second data signals corresponding to each sub-display area 10 in the brightness adjustment area 130.

A small desktop-class rotating display apparatus with a close-range edge axis is taken as an example. Referring to FIG. 15, the display panel 100 of the display apparatus 1000 includes three brightness adjustment areas 130, i.e., 133, 132, and 131 that are sequentially away from the rotation axis 200. The length direction of each brightness adjustment area 130 is parallel to the rotation axis 200, and the three brightness adjustment areas 130 are arranged in parallel along the direction perpendicular to the rotation axis 200. Each brightness adjustment area 130 includes three sub-display areas 10.

The source driving circuit 30 stores preset duty ratio coefficients of second data signals corresponding to sub-pixels 11 in each brightness adjustment area 130 of the three brightness adjustment areas 130, that is, a duty ratio coefficient of each second data signal in groups of second data signals corresponding to the sub-display areas 10 in each brightness adjustment area 130. According to actual needs, the duty ratio coefficients of the second data signals corresponding to the sub-pixels 11 in each brightness adjustment area 130 may be obtained by preset optical simulation and actual brightness test which is not limited by some embodiments of the present disclosure.

A perpendicular distance between the brightness adjustment area 131 and the rotation axis 200 is the largest. Optionally, a duty ratio coefficient of a second data signal corresponding to each sub-pixel 11 in the brightness adjustment area 131 is preset to be 1. That is, the source driving circuit 30 does not adjust and directly outputs three groups of second data signals obtained by conversion and corresponding to three sub-display areas 10 in the brightness adjustment area 131. Of course, the duty ratio coefficient of the second data signal corresponding to each sub-pixel 11 in the brightness adjustment area 131 may also be appropriately increased in a case where the data does not overflow. For example, the duty ratio coefficient of the second data signal corresponding to each sub-pixel 11 in the brightness adjustment area 131 is preset to be 1.1. The source driving circuit 30 processes the three groups of second data signals obtained by conversion and corresponding to the three sub-display areas 10 in the brightness adjusting area 131, and the duty ratios of the three groups of second data signals are separately multiplied by 1.1, so as to obtain each second data signal in the three adjusted groups of second data signals in one-to-one correspondence with the three sub-display areas 10 in the brightness adjustment area 131. The adjusted second data signal is, for example, a pulse width modulation (PWM) control signal.

A perpendicular distance between the brightness adjustment area 132 and the rotation axis 200 is slightly less than the perpendicular distance between the brightness adjustment area 131 and the rotation axis 200. Therefore, a duty ratio coefficient of a second data signal corresponding to each sub-pixel 11 in the brightness adjustment area 132 may be preset to be 0.6 to 0.9 times of the preset duty ratio coefficient of the second data signal corresponding to each sub-pixel 11 in the brightness adjustment area 131. Optionally, the duty ratio coefficient of the second data signal corresponding to each sub-pixel 11 in the brightness adjustment area 132 is preset to be 0.8, and the source driving circuit 30 processes three groups of second data signals obtained by conversion and corresponding to the three sub-display areas 10 in the brightness adjusting area 132, and the duty ratios of the three groups of second data signals are separately multiplied by 0.8, so as to obtain each second data signal in the three adjusted groups of second data signals in one-to-one correspondence with the three sub-display areas 10 in the brightness adjustment area 132.

A perpendicular distance between the brightness adjustment area 133 and the rotation axis 200 is the smallest. Therefore, a duty ratio coefficient of a second data signal corresponding to each sub-pixel 11 in the brightness adjustment area 133 needs to be less than the duty ratio coefficient of the second data signal corresponding to each sub-pixel 11 in the brightness adjustment area 132, i.e., less than 0.6 times of the preset duty ratio coefficient of the second data signal corresponding to each sub-pixel 11 in the brightness adjustment area 131. Optionally, the duty ratio coefficient of the second data signal corresponding to each sub-pixel 11 in the brightness adjustment area 133 is preset to be 0.4, and the source driving circuit 30 processes three groups of second data signals obtained by conversion and corresponding to the three sub-display areas 10 in the brightness adjusting area 133, and the duty ratios of the three groups of second data signals are separately multiplied by 0.4, so as to obtain each second data signal in the three adjusted groups of second data signals in one-to-one correspondence with the three sub-display areas 10 in the brightness adjustment area 133. Herein, the preset duty ratio coefficient of the second data signal corresponding to each sub-pixel 11 in the brightness adjustment area 133 should not be too low, for example, not less than 0.3 times of the preset duty ratio coefficient of the second data signal corresponding to each sub-pixel 11 in the brightness adjustment area 131, so as to prevent the sub-pixels 11 in the display apparatus from excessively being in a low brightness state, and affecting the display effect of the display apparatus.

In some embodiments of the present disclosure, by using the persistence of vision effect of the human eyes, the duty ratio coefficient of each brightness adjustment area 130 increases sequentially along the direction perpendicular to the rotation axis 200 and progressively away from the rotation axis 200. The source driving circuit 30 adjusts the duty ratios of the second data signals corresponding to the plurality of sub-pixels 11 in each brightness adjustment area 130 according to a certain ratio, so as to realize an adjustment of the average display brightness of each brightness adjustment area 130. Therefore, the average display brightness of the brightness adjustment area 130 closer to the rotation axis 200 viewed by the human eyes is proximate to the average display brightness of the brightness adjustment area 130 further away from the rotation axis 200. Thus, the case where the three-dimensional voxel dot matrix of the display apparatus is bright inside and dark outside during displaying images is improved, and the brightness of the stereoscopic images viewed by the viewer is more uniform, thereby realizing a good voxel uniformity effect of the rotating display apparatus.

In some other embodiments, the display apparatus 1000 includes a voltage-driven display apparatus such as an LCD display apparatus. In this case, the brightness parameter includes a gray coefficient of each second data signal in each group of the second data signal obtained by conversion and corresponding to each sub-display area 10 in the target brightness adjustment area 130. Along the direction perpendicular to the rotation axis 200 and progressively away from the rotation axis 200, a ratio of gray coefficients of brightness adjustment areas 130 is inversely related to a ratio of the average display brightness of the brightness adjustment areas 130 in a case where the at least two groups of second data signals obtained by conversion are not adjusted separately. That is to say, in a case where the groups of second data signals obtained by conversion are not adjusted separately, the greater an average display brightness of the target brightness adjustment area 130 is, the smaller the gray coefficient corresponding to the target brightness adjustment area 130 during adjustment is. In the case where the groups of second data signals obtained by conversion are not adjusted separately, the darker the average display brightness of the target brightness adjustment area 130 is, the greater the gray coefficient corresponding to the target brightness adjustment area 130 during adjustment is. After such adjustment, an average display brightness of a brightness adjustment area 130 closer to the rotation axis 200 viewed by the human eyes is proximate to or equal to an average display brightness of a brightness adjustment area 130 further away from the rotation axis 200. Thus, the case where the three-dimensional voxel dot matrix of the display apparatus is bright inside and dark outside during displaying an image is improved, and the brightness of the stereoscopic image viewed by the viewer is more uniform, thereby realizing a good voxel uniformity effect of the rotating display apparatus.

Herein, for the LCD display apparatus, the second data signal is, for example, a signal representing a gray value.

Figure 20:
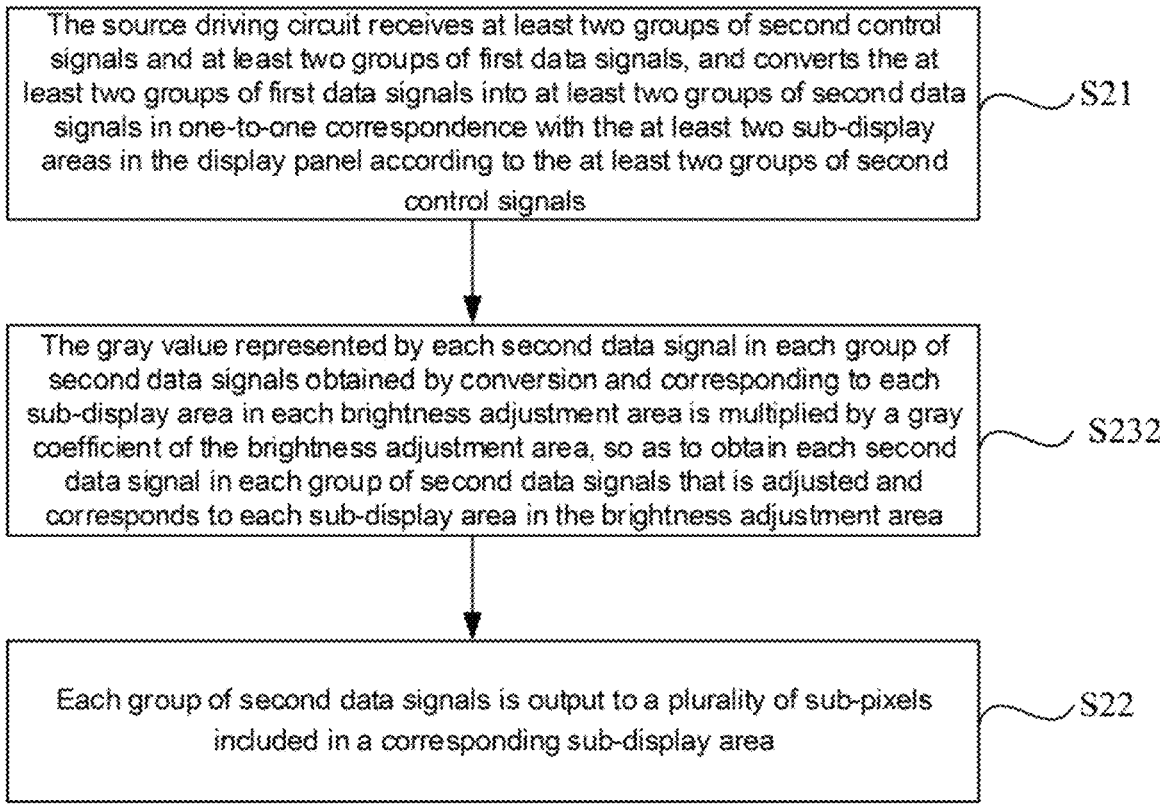
FIG. 20 is a flow diagram of yet another driving method of a display apparatus, in accordance with some embodiments.

In some embodiments, referring to FIG. 20, the at least two groups of second data signals obtained by conversion are adjusted separately according to the preset brightness parameter of each brightness adjustment area 130, which includes S232.

In S232, the gray value represented by each second data signal in each group of second data signals obtained by conversion and corresponding to each sub-display area 10 in each brightness adjustment area 130 is multiplied by a gray coefficient of the brightness adjustment area 130, so as to obtain each second data signal in each adjusted group of second data signals corresponding to each sub-display area 10 in the brightness adjustment area 130. The brightness of any sub-pixel 11 in the LCD display apparatus is related to the magnitude of the gray value represented by the second data signal received by the sub-pixel 11. The greater the gray value corresponding to the sub-pixel 11 is, the greater a deflection angle of liquid crystals in the sub-pixel 11 is, and the greater the brightness is.

The display apparatus 1000 shown in FIG. 15 is taken as an example. The display apparatus 1000 is an LCD display apparatus, and the display panel 100 thereof includes three brightness adjustment areas 130, i.e., 133, 132, and 131 that are sequentially away from the rotation axis 200. A length direction of each brightness adjustment area 130 is parallel to the rotation axis 200, and the three brightness adjustment areas 130 are arranged in parallel along a direction perpendicular to the rotation axis 200. Each brightness adjustment area 130 includes three sub-display areas 10.

The source driving circuit 30 stores preset gray coefficients of the second data signals corresponding to the sub-pixels 11 in each brightness adjustment area 130 of the three brightness adjustment areas 130, that is, a gray coefficient of each second data signal in groups of second data signals corresponding to the sub-display areas 10 in each brightness adjustment area 130. according to actual needs, the gray coefficients of the second data signals corresponding to the sub-pixels 11 in each brightness adjustment area 130 may be obtained by preset optical simulation and actual brightness test which is not limited by some embodiments of the present disclosure.

A perpendicular distance between the brightness adjustment area 131 and the rotation axis 200 is the largest. Optionally, a gray coefficient of a second data signal corresponding to each sub-pixel 11 in the brightness adjustment area 131 is preset to be 1. That is, the source driving circuit 30 does not adjust and directly outputs gray values represented by three groups of second data signals obtained by conversion and corresponding to the three sub-display areas 10 in the brightness adjustment area 131. Of course, the gray coefficient of the second data signal corresponding to each sub-pixel 11 in the brightness adjustment area 131 may also be appropriately increased in a case where the data does not overflow. For example, the gray coefficient of the second data signal corresponding to each sub-pixel 11 in the brightness adjustment area 131 is preset to be 1.2. The source driving circuit 30 processes the three groups of second data signals obtained by conversion and corresponding to the three sub-display areas 10 in the brightness adjusting area 131, and the gray values represented by the three groups of second data signals are separately multiplied by 1.2, so as to obtain each second data signal in the three adjusted groups of second data signals in one-to-one correspondence with the three sub-display areas 10 in the brightness adjustment area 131.

A perpendicular distance between the brightness adjustment area 132 and the rotation axis 200 is slightly less than the perpendicular distance between the brightness adjustment area 131 and the rotation axis 200. Therefore, a gray coefficient of a second data signal corresponding to each sub-pixel 11 in the brightness adjustment area 132 may be preset to be 0.6 to 0.9 times of the preset gray coefficient of the second data signal corresponding to each sub-pixel 11 in the brightness adjustment area 131. Optionally, the gray coefficient of the second data signal corresponding to each sub-pixel 11 in the brightness adjustment area 132 is preset to be 0.7, and the source driving circuit 30 processes three groups of second data signals obtained by conversion and corresponding to the three sub-display areas 10 in the brightness adjusting area 132, and the gray values represented by the three groups of second data signals are separately multiplied by 0.7, so as to obtain each second data signal in the three adjusted groups of second data signals in one-to-one correspondence with the three sub-display areas 10 in the brightness adjustment area 132.

A perpendicular distance between the brightness adjustment area 133 and the rotation axis 200 is the smallest. Therefore, a gray coefficient of a second data signal corresponding to each sub-pixel 11 in the brightness adjustment area 133 needs to be less than the gray coefficient of the second data signal corresponding to each sub-pixel 11 in the brightness adjustment area 132, i.e., less than 0.6 times of the preset gray coefficient of the second data signal corresponding to each sub-pixel 11 in the brightness adjustment area 131. Optionally, the gray coefficient of the second data signal corresponding to each sub-pixel 11 in the brightness adjustment area 133 is preset to be 0.5, and the source driving circuit 30 processes three groups of second data signals obtained by conversion and corresponding to the three sub-display areas 10 in the brightness adjusting area 133, and the gray values represented by the three groups of second data signals are separately multiplied by 0.5, so as to obtain each second data signal of the three adjusted groups of second data signals in one-to-one correspondence with the three sub-display areas 10 in the brightness adjustment area 133. Herein, the preset gray coefficient of the second data signal corresponding to each sub-pixel 11 in the brightness adjustment area 133 should not be too low, for example, not less than 0.5 times of the preset gray coefficient of the second data signal corresponding to each sub-pixel 11 in the brightness adjustment area 131, so as to prevent the sub-pixels 11 in the display apparatus from excessively being in a low brightness state, thereby affecting the display effect of the display apparatus.

In some embodiments of the present disclosure, by using the persistence of vision effect of the human eyes, the gray coefficient of each brightness adjustment area 130 increases sequentially along the direction perpendicular to the rotation axis 200 and progressively away from the rotation axis 200. The source driving circuit 30 adjusts the gray values represented by the second data signals corresponding to the plurality of sub-pixels 11 in each brightness adjustment area 130 according to a certain ratio, so as to realize an adjustment of the average display brightness of each brightness adjustment area 130. Therefore, the average display brightness of the brightness adjustment area 130 closer to the rotation axis 200 viewed by the human eyes is proximate to or equal to the average display brightness of the brightness adjustment area 130 further away from the rotation axis 200. Thus, the case where the three-dimensional voxel dot matrix of the display apparatus is bright inside and dark outside during displaying images is improved, and the brightness of the stereoscopic images viewed by the viewer is more uniform, thereby realizing a good voxel uniformity effect of rotating display apparatus.

Figure 22:
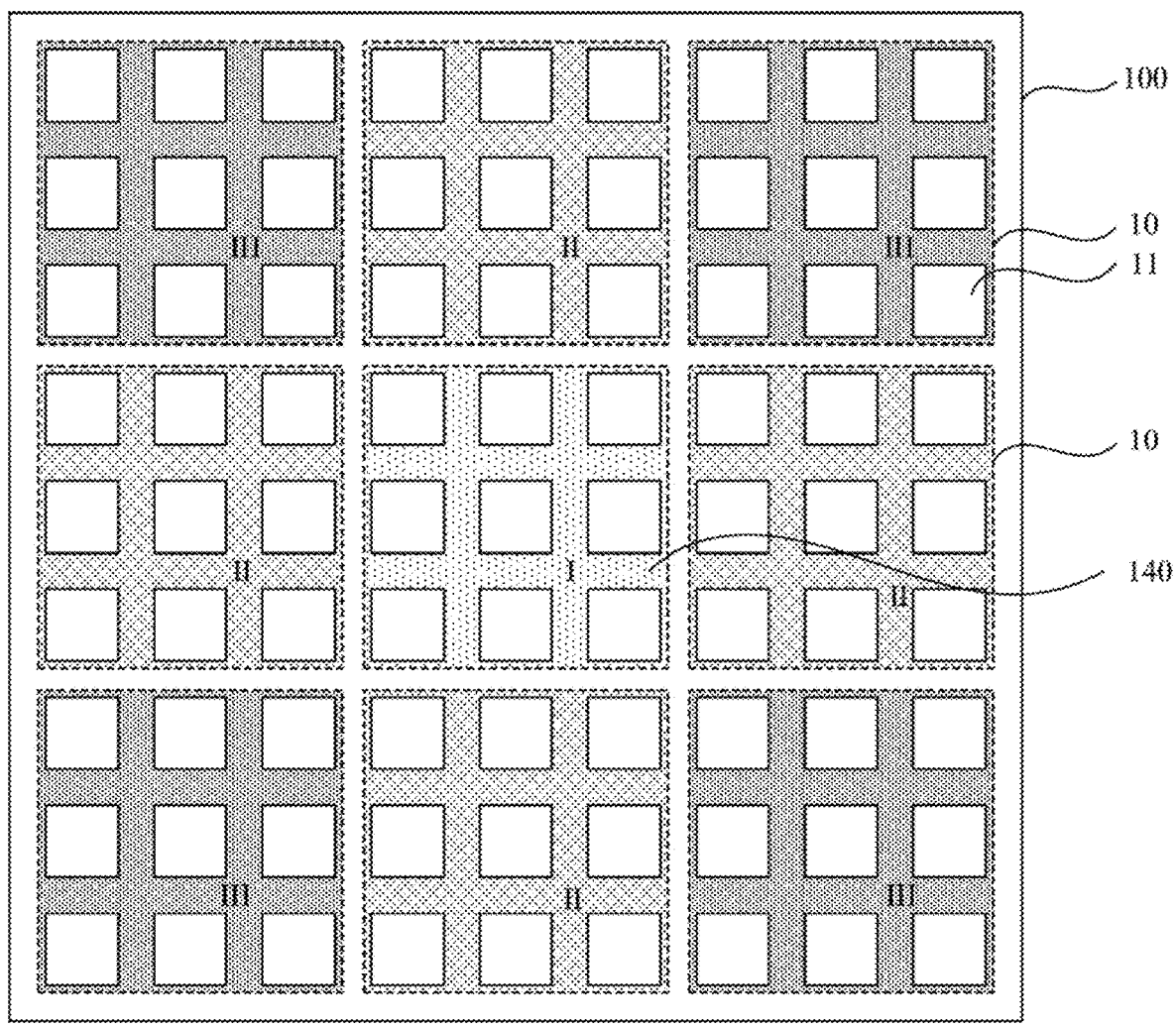
FIG. 22 is a schematic diagram showing a distribution of different levels of viewing areas of a display apparatus, in accordance with some embodiments.

Referring to FIG. 22, in some embodiments, the display panel 100 has at least two different levels of viewing areas 140, and each level of the at least two different levels of viewing areas 140 includes at least one sub-display area 10. Referring to FIG. 21, each gate driving sub-circuit 21 outputs one group of gate driving signals to a plurality of sub-pixels 11 included in a corresponding sub-display area 10 in the display panel 100, which includes S11. In S11, each gate driving sub-circuit 21 corresponding to each sub-display area 10 in viewing area(s) 140 of the same level outputs the group of gate driving signals representing the same frame rate to the plurality of sub-pixels 11 included in the corresponding sub-display area 10, so as to make a frame rate of an image displayed on each sub-display area 10 in the viewing area(s) 140 of the level equal; and gate driving sub-circuits 21 corresponding to sub-display areas 10 in viewing areas 140 of different levels output groups of gate driving signals representing different frame rates to a plurality of sub-pixels 11 included in corresponding sub-display areas 10, so as to make frame rates of images displayed on the viewing areas 140 of different levels different. Herein, a frame rate of an image displayed on each viewing area 140 progressively decreases as a level of the viewing area 140 progressively increases.

In some embodiments of the present disclosure, according to actual needs, a high frame rate may be set for sub-display areas 10 in a part of the display area (for example, the main viewing area) in an image, and a low frame rate may be set for sub-display areas 10 in another part of the display area (for example, the secondary viewing area) in the image. Compared with a manner of setting a high frame rate for the whole display panel 100, a data amount of the source signals may be effectively reduced, thereby effectively reducing the overall bandwidth of data transmission.

For example, referring to the display apparatus shown in FIG. 22, the display apparatus may be applied to application scenarios such as the AR display or the VR display. The display panel 100 of the display apparatus has three different levels of viewing areas 140, i.e., the levels □, □, and □. Positions of the viewing areas 140 of the levels are shown in FIG. 22. In the three different levels of viewing areas 140, the level I viewing area 140 includes one sub-display area 10, and one gate driving sub-circuit 21 corresponding to the sub-display area 10 outputs one group of gate driving signals representing a frame rate of 240 Hz to a plurality of sub-pixels 11 included in the sub-display area 10. The level □ viewing area 140 includes four sub-display areas 10, and four gate driving sub-circuits 21 corresponding to the four sub-display areas 10 respectively output four groups of gate driving signals representing a frame rate of 120 Hz to a plurality of sub-pixels 11 included in corresponding sub-display areas 10. The level □ viewing area 140 includes four sub-display areas 10, and four gate driving sub-circuits 21 corresponding to the four sub-display areas 10 respectively output four groups of gate driving signals representing a frame rate of 90 Hz to a plurality sub-pixels 11 included in corresponding sub-display areas 10. Therefore, a frame rate of an image displayed on the sub-display area 10 in the level I viewing area 140 is 240 Hz, and a frame rate of images displayed on the four sub-display areas 10 in the II level viewing area 140 is 120 Hz, and a frame rate of images displayed on the four sub-display areas 10 in the □ viewing area 140 is 90 Hz. It is realized that when the viewer views the display images, the frame rate of the image proximate to a center of the display panel 100 is high, and the frame rate of the image proximate to an edge of the display panel 100 is low. Compared with the manner of setting a high frame rate for the whole display panel 100, the data amount of the source signals may be effectively reduced, thereby effectively reducing the overall bandwidth of data transmission.

Figure 16:
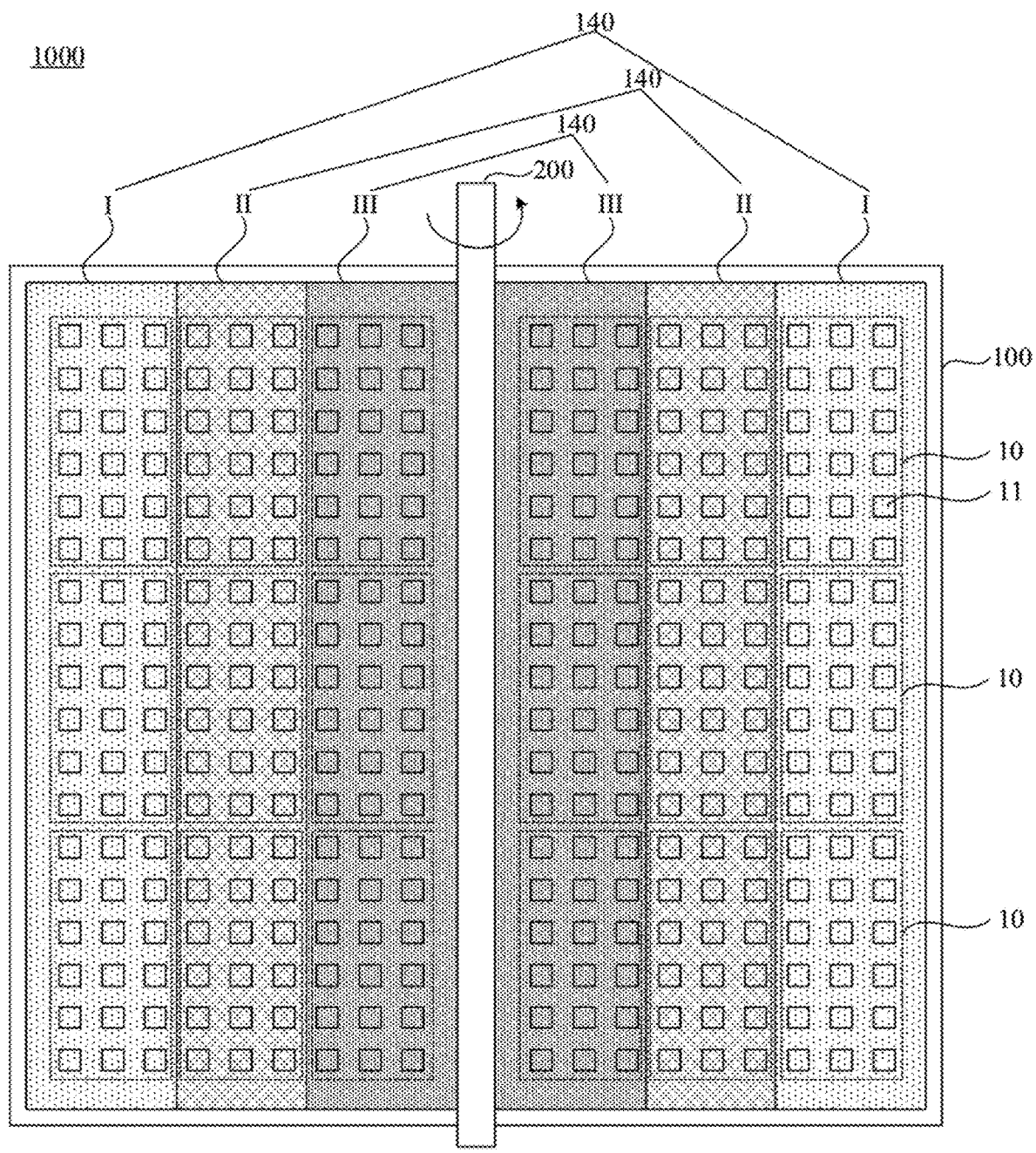
FIG. 16 is a structural schematic diagram of yet another display apparatus, in accordance with some embodiments.

For example, referring to the display apparatus 1000 shown in FIG. 16, the display apparatus 1000 may be applied to application scenarios such as the rotating display. The display panel 100 of the display apparatus has three different levels of viewing areas 140, i.e., the levels I, □, and □. Positions of the viewing areas 140 of levels are shown in FIG. 16. In the three different levels of viewing areas 140, the level I viewing area 140 includes six sub-display areas 10, and six gate driving sub-circuits 21 corresponding to the six sub-display areas 10 respectively output six groups of gate driving signals representing a frame rate of 10000 Hz to a plurality of sub-pixels 11 included in corresponding sub-display areas 10. The level □ viewing area 140 includes six sub-display areas 10, and six gate driving sub-circuits 21 corresponding to the six sub-display areas 10 respectively output six groups of gate driving signals representing a frame rate of 7000 Hz to a plurality of sub-pixels 11 included in corresponding sub-display areas 10. The level □ viewing area 140 includes six sub-display areas 10, and six gate driving sub-circuits 21 corresponding to the six sub-display areas 10 respectively output six groups of gate driving signals representing a frame rate of 5000 Hz to a plurality sub-pixels 11 included in corresponding sub-display areas 10. Therefore, a frame rate of images displayed on the six sub-display areas 10 in the level I viewing area 140 is 10000 Hz, and a frame rate of images displayed on the six sub-display areas 10 in the level II viewing area 140 is 7000 Hz, and a frame rate of images displayed on the six sub-display areas 10 in the level □ viewing area 140 is 5000 Hz. It is realized that when the viewer views the display images, the frame rate of the display image progressively increases in a direction away from the rotation axis 200.

On one hand, compared with the manner of setting a high frame rate for the whole display panel 100, the above manner of setting different levels of viewing areas 140 corresponding to different frame rates may effectively reduce the data amount of the source signals input to the display apparatus, thereby effectively reducing the overall bandwidth of data transmission. On another hand, due to the persistence of vision effect of the human eyes, for a same image, if the image is displayed at a high frame rate, the overall brightness of the image viewed by the human eyes is bright; if the image is displayed at a low frame rate, the overall brightness of the image viewed by the human eyes is dark. Therefore, during the rotating display, if the frame rates of images displayed by all the sub-pixels 11 in the display panel 100 are synchronized, the images viewed by the human eyes will appear bright inside and dark outside. In some embodiments of the present disclosure, different frame rates are set for the viewing areas 140 of different levels, and the frame rate of an image displayed by each viewing area 140 along the direction away from the rotation axis 200 progressively increases, so that the average display brightness of the viewing areas 140 of different levels may be adjusted. As a result, the average display brightness of the viewing area 140 closer to the rotation axis 200 viewed by the human eyes is proximate to the average display brightness of the viewing area 140 further away from the rotation axis 200. Thus, a case where the three-dimensional voxel dot matrix of the display apparatus is bright inside and dark outside during displaying images is improved, and the brightness of the stereoscopic images viewed by the viewer is more uniform, thereby realizing a good voxel uniformity effect of rotating display apparatus.

It is worth mentioning that in a process of improving the case where the three-dimensional voxel dot matrix of the display apparatus is bright inside and dark outside during displaying images, it is possible to adopt a method of adjusting the brightness parameter of the second data signal, or adopting a method of setting different frame rates for the different levels of the viewing areas 140. Of course, the above two methods may also be adopted at the same time, which is not limited in some embodiments of the present disclosure.

Some embodiments of the present disclosure provide a computer product including one or more processors, and the processor is configured to execute computer instructions, so as to perform one or more steps in the driving method of the display apparatus according to any of the above embodiments. The one or more processors are, for example, provided in the driving chip 50 of the display apparatus.

The processor may be a central processing unit (CPU), or may be other general-purpose processors, a digital signal processor (DSP), an application specific integrated circuits (ASIC), a field programmable gate array (FPGA), or other programmable logic devices, a discrete gate or transistor logic device, a discrete hardware component, or the like. Herein, The general-purpose processor may be a microprocessor or any conventional processor or the like.

Some embodiments of the present disclosure provide a non-transitory computer-readable storage medium storing an executable instruction that, when executed by the display apparatus of any of the above embodiments, causes the display apparatus to perform the driving method of the display apparatus of any of the above embodiments.

The non-transitory computer-readable storage medium may include, but is not limited to: a magnetic storage device (such as a hard disk, a floppy disk, or a magnetic tape), an optical disk (such as a compact disk (CD), or a digital versatile disk (DVD)), a smart card or a flash memory device (such as an erasable programmable read-only memory (EPROM), a card, a stick or a key driver). The various storage media described in the embodiments of the present disclosure may represent one or more devices and/or other machine-readable media for storing information. The machine-readable media may include, but are not limited to, wireless channels and various other media capable of storing, containing, and/or carrying instructions and/or data.

Some embodiments of the present disclosure provide a computer program that, when loaded into a processor, causes the processor to perform the driving method of the display apparatus of any of the above embodiments.

Beneficial effects of the computer product, non-transitory computer-readable storage medium, and the computer program may be referred to descriptions in some embodiments of the foregoing display apparatus, which will not be described in detail herein.

In the description of the above embodiments, specific features, structures, connection relations or characteristics may be combined in any suitable manner in any one or more embodiments or examples.

The foregoing descriptions are merely specific implementation manners of the present disclosure, but the protection scope of the present disclosure is not limited thereto. Any person skilled in the art could conceive of changes or replacements within the technical scope of the present disclosure, which shall all be included in the protection scope of the present disclosure. Therefore, the protection scope of the present disclosure shall be subjected to the protection scope of the claims.

What is claimed is:

1. A display apparatus, comprising:
a display panel, a display area of the display panel including a×b sub-display areas, and each sub-display area of the a×b sub-display areas including a plurality of sub-pixels, a number of the plurality of sub-pixels included in at least one sub-display area being different from a number of the plurality of sub-pixels included in another sub-display area, where a is equal to or greater than 2 and b is equal to or greater than 2;
a×b groups of gate lines in one-to-one correspondence with the a×b sub-display areas;
a×b groups of data lines in one-to-one correspondence with the a×b sub-display areas; and
a gate driving circuit including a×b gate driving sub-circuits in one-to-one correspondence with the a×b sub-display areas, each gate driving sub-circuit of the a×b gate driving sub-circuits being electrically connected to a plurality of sub-pixels included in a corresponding sub-display area,
wherein the plurality of sub-pixels included in each sub-display area are arranged in a plurality of rows and a plurality of columns; for each sub-display area, a group of gate lines corresponding to the sub-display area includes a gate line, and the gate line corresponding to the sub-display area is electrically connected to the plurality of sub-pixels included in the sub-display area; and a number of data lines included in a group of data lines corresponding to the sub-display area is equal to a number of the sub-pixels included in the sub-display area, and the data lines in the group of data lines corresponding to the sub-display area are electrically connected to the plurality of sub-pixels included in the sub-display area in a one-to-one correspondence manner; and
each gate driving sub-circuit is configured to:
receive a group of first control signals;
generate a group of gate driving signals according to the group of first control signals; and
output the group of gate driving signals to the plurality of sub-pixels included in the corresponding sub-display area.

2. The display apparatus according to claim 1, wherein each group of the a×b groups of gate lines is electrically connected to the plurality of sub-pixels included in the corresponding sub-display area; and
each gate driving sub-circuit is electrically connected to the group of gate lines corresponding to the corresponding sub-display area.

3. The display apparatus according to claim 2, further comprising a source driving circuit, the source driving circuit being configured to:
receive a×b groups of second control signals and a×b groups of first data signals;
convert the a×b groups of first data signals into a×b groups of second data signals in one-to-one correspondence with the a×b sub-display areas according to the a×b groups of second control signals; and
output each group of second data signals to the plurality of sub-pixels included in the corresponding sub-display area.

4. The display apparatus according to claim 3, wherein each group of the a×b groups of data lines is electrically connected to the plurality of sub-pixels included in the corresponding sub-display area; and the source driving circuit is electrically connected to the a×b groups of data lines.

5. The display apparatus according to claim 4, further comprising a driving chip, wherein the driving chip includes the gate driving circuit and a×b driving ports;
the a×b driving ports are electrically connected to the a×b gate driving sub-circuits in a one-to-one correspondence manner; and
each gate driving sub-circuit is electrically connected to the group of gate lines corresponding to the corresponding sub-display area through a corresponding driving port.

6. The display apparatus according to claim 5, wherein the driving chip further includes the source driving circuit and a×b data ports; and
the source driving circuit is electrically connected to the a×b groups of data lines through the a×b data ports.

7. The display apparatus according to claim 3, further comprising a timing controller electrically connected to the gate driving circuit and the source driving circuit, the timing controller being configured to:
receive source signals;
generate a×b groups of first control signals, the a×b groups of second control signals, and the a×b groups of first data signals according to the source signals;
output the a×b groups of first control signals to the gate driving circuit; and
output the a×b groups of second control signals and the a×b groups of first data signals to the source driving circuit.

8. The display apparatus according to claim 3, further comprising a rotation axis, the display panel being configured to be rotatable around the rotation axis; wherein
the display panel has at least two brightness adjustment areas, a length direction of each brightness adjustment area of the at least two brightness adjustment areas is parallel to the rotation axis, and the at least two brightness adjustment areas are arranged in parallel along a direction perpendicular to the rotation axis; and each brightness adjustment area including at least one sub-display area.

9. The display apparatus according to claim 8, wherein the source driving circuit is further configured to adjust each group of second data signals to be output to each sub-display area in a corresponding brightness adjustment area separately according to a preset brightness parameter of each brightness adjustment area, so as to make an average display brightness of each of the at least two brightness adjustment areas be same or approximately same; wherein the brightness parameter of each brightness adjustment area increases sequentially along a direction perpendicular to the rotation axis and progressively away from the rotation axis.

10. A driving method of a display apparatus, wherein the display apparatus, comprising:
a display panel, a display area of the display panel including a×b sub-display areas, and each sub-display area of the a×b sub-display areas including a plurality of sub-pixels, a number of the plurality of sub-pixels included in at least one sub-display area being different from a number of the plurality of sub-pixels included in another sub-display area, where a is equal to or greater than 2 and b is equal to or greater than 2;

a×b groups of gate lines in one-to-one correspondence with the a×b sub-display areas;

a×b groups of data lines in one-to-one correspondence with the a×b sub-display areas; and a gate driving circuit including a×b gate driving sub-circuits in one-to-one correspondence with the a×b sub-display areas, each gate driving sub-circuit of the a×b gate driving sub-circuits being electrically connected to a plurality of sub-pixels included in a corresponding sub-display area, wherein the plurality of sub-pixels included in each sub-display area are arranged in a Plurality of rows and a plurality of columns; for each sub-display area, a group of gate lines corresponding to the sub-display area includes a gate line, and the gate line corresponding to the sub-display area is electrically connected to the plurality of sub-pixels included in the sub-display area; and a number of data lines included in a group of data lines corresponding to the sub-display area is equal to a number of the sub-pixels included in the sub-display area, and the data lines in the group of data lines corresponding to the sub-display area are electrically connected to the plurality of sub-pixels included in the sub-display area in a one-to-one correspondence manner;

the driving method comprising:

receiving, by each gate driving sub-circuit included in the gate driving circuit, the group of first control signals;

generating, by each gate driving sub-circuit, the group of gate driving signals according to the group of first control signals; and outputting, by each gate driving sub-circuit, the group of gate driving signals to the plurality of sub-pixels included in the corresponding sub-display area in the display panel.

11. The driving method according to claim 10, wherein the display apparatus further includes a source driving circuit; the driving method further comprises:

receiving, by the source driving circuit, a×b groups of second control signals and a×b groups of first data signals;

converting, by the source driving circuit, the a×b groups of first data signals into a×b groups of second data signals in one-to-one correspondence with the a×b sub-display areas in the display panel according to the a×b groups of second control signals; and outputting, by the source driving circuit, each group of second data signals to the plurality of sub-pixels included in the corresponding sub-display area.

12. The driving method according to claim 11, wherein the display apparatus further includes a rotation axis, and the display panel is configured to be rotatable around the rotation axis; the display panel has at least two brightness adjustment areas, and a length direction of each brightness adjustment area of the at least two brightness adjustment areas is parallel to the rotation axis, and the at least two brightness adjustment areas are arranged in parallel along a direction perpendicular to the rotation axis; and each brightness adjustment area includes at least one sub-display area;

before each group of second data signals is output to the plurality of sub-pixels included in the corresponding sub-display area, the driving method further comprises:

adjusting separately, by the source driving circuit, the a×b groups of second data signals obtained by conversion according to a preset brightness parameter of each brightness adjustment area, so as to make an average display brightness of each brightness adjustment area of the at least two brightness adjustment areas be same or approximately same;

wherein the brightness parameter of each brightness adjustment area increases sequentially along a direction perpendicular to the rotation axis and progressively away from the rotation axis.

13. The driving method according to claim 12, wherein the brightness parameter includes a duty ratio coefficient of each second data signal in each group of second data signals obtained by conversion and corresponding to a respective sub-display area in a target brightness adjustment area;

along the direction perpendicular to the rotation axis and progressively away from the rotation axis, a ratio of duty ratio coefficients of the brightness adjustment areas is inversely related to a ratio of display brightness of the brightness adjustment areas in a case where the a×b groups of second data signals obtained by conversion are not adjusted separately; and adjusting the a×b groups of second data signals obtained by conversion separately according to a preset brightness parameter of each brightness adjustment area, includes:

multiplying a duty ratio of each second data signal in each group of second data signals obtained by conversion and corresponding to a respective sub-display area in each brightness adjustment area by a duty ratio coefficient of the brightness adjustment area, so as to obtain each second data signal in each adjusted group of second data signals corresponding to the respective sub-display area in the brightness adjustment area.

14. The driving method according to claim 12, wherein the brightness parameter includes a gray coefficient of each second data signal in each group of second data signals obtained by conversion and corresponding to a respective sub-display area in a target brightness adjustment area;

along the direction perpendicular to the rotation axis and progressively away from the rotation axis, a ratio of gray coefficients of the brightness adjustment areas is inversely related to a ratio of display brightness of the brightness adjustment areas in a case where the a×b groups of second data signals obtained by conversion are not adjusted separately; and adjusting the a×b groups of second data signals obtained by conversion separately according to a preset brightness parameter of each brightness adjustment area, includes:

multiplying a gray value represented by each second data signal in each group of second data signals obtained by conversion and corresponding to a respective sub-display area in each brightness adjustment area by a gray coefficient of the brightness adjustment area, so as to obtain each second data signal in each adjusted group of second data signals corresponding to the respective sub-display area in the brightness adjustment area.

15. The driving method according to claim 10, wherein the display panel has at least two different levels of viewing areas, and each level of the at least two different levels of viewing areas includes at least one sub-display area;

outputting, by each gate driving sub-circuit, the group of gate driving signals to the plurality of sub-pixels included in the corresponding sub-display area in the display panel, includes:

outputting, by each gate driving sub-circuit corresponding to a respective sub-display area in each viewing area of a same level, the group of gate driving signals representing a same frame rate to the plurality of sub-pixels included in the corresponding sub-display area, so as to make a frame rate of an image displayed on each sub-display area in each viewing area of the level equal; and outputting, by gate driving sub-circuits corresponding to sub-display areas in viewing areas of different levels, groups of gate driving signals representing different frame rates to a plurality of sub-pixels included in corresponding sub-display areas, so as to make frame rates of images displayed on the viewing areas of different level different; wherein a frame rate of an image displayed on each viewing area progressively decreases as a level of the viewing area progressively increases.

16. A computer product, comprising at least one processor, wherein the at least one processor is configured to execute computer instructions to perform the driving method according to claim 10.

17. Anon-transitory computer-readable storage medium storing an executable instruction that, when executed by a display apparatus, causes the display apparatus to perform a driving method of the display apparatus, wherein the display apparatus, comprising:
- a display panel, a display area of the display panel including a×b sub-display areas, and each sub-display area of the a×b sub-display areas including a plurality of sub-pixels, a number of the plurality of sub-pixels included in at least one sub-display area being different from a number of the Plurality of sub-pixels included in another sub-display area, where a is equal to or greater than 2 and b is equal to or greater than 2;
- a×b groups of gate lines in one-to-one correspondence with the a×b sub-display areas;
- a×b groups of data lines in one-to-one correspondence with the a×b sub-display areas; and
- a gate driving circuit including a×b gate driving sub-circuits in one-to-one correspondence with the a×b sub-display areas, each gate driving sub-circuit of the a×b gate driving sub-circuits being electrically connected to a plurality of sub-pixels included in a corresponding sub-display area, wherein the plurality of sub-pixels included in each sub-display area are arranged in a Plurality of rows and a plurality of columns; for each sub-display area, a group of gate lines corresponding to the sub-display area includes a gate line, and the gate line corresponding to the sub-display area is electrically connected to the plurality of sub-pixels included in the sub-display area; and a number of data lines included in a group of data lines corresponding to the sub-display area is equal to a number of the sub-pixels included in the sub-display area, and the data lines in the group of data lines corresponding to the sub-display area are electrically connected to the Plurality of sub-pixels included in the sub-display area in a one-to-one correspondence manner;

the driving method including:
- receiving, by each gate driving sub-circuit included in the gate driving circuit, the group of first control signals;
- generating, by each gate driving sub-circuit, the group of gate driving signals according to the group of first control signals; and
- outputting, by each gate driving sub-circuit, the group of gate driving signals to the plurality of sub-pixels included in the corresponding sub-display area in the display panel.

\* \* \* \* \*